(12) United States Patent  
Katada et al.

(10) Patent No.: US 7,812,491 B2
(45) Date of Patent: Oct. 12, 2010

(54) STEPPING MOTOR

(75) Inventors: Yoshinori Katada, Ina-machi (JP);
Mitsuru Yanagisawa, Kawaguchi (JP);
Ryuta Yamawaki, Kawaguchi (JP);
Hideki Nakata, Kyoto (JP); Masayuki Shiwa, Fukuoka (JP); Hideki Aikoh, Osaka (JP); Hironori Tomita, Nara (JP)

(73) Assignees: Nidec Copal Corporation, Tokyo (JP);
Matsushita Electric Industrial Co., Ltd., Kadoma-shi, Osaka (JP)

( * ) Notice: Subject to any disclaimer, the term of this patent is extended or adjusted under 35 U.S.C. 154(b) by 22 days.

(21) Appl. No.: 11/895,801

(22) Filed: Aug. 27, 2007

(65) Prior Publication Data

US 2008/0054764 A1 Mar. 6, 2008

(30) Foreign Application Priority Data

Aug. 30, 2006 (JP) .......................... P2006-234333

(51) Int. Cl.
*H02K 37/14* (2006.01)
(52) U.S. Cl. ........................................ 310/89; 310/407

(58) Field of Classification Search ............... 310/49 R, 310/89, 257, 90, 91, 406–409, 426, 428, 310/429, 49.01
See application file for complete search history.

(56) References Cited

U.S. PATENT DOCUMENTS

| 3,504,253 | A | * | 3/1970 | Kavanaugh | 318/696 |
| 3,558,940 | A | * | 1/1971 | Chestnut et al. | 310/41 |
| 5,986,379 | A | * | 11/1999 | Hollenbeck et al. | 310/257 |
| 6,060,800 | A | * | 5/2000 | Suzuki et al. | 310/49.16 |
| 6,223,416 | B1 | * | 5/2001 | Boyd et al. | 29/596 |

FOREIGN PATENT DOCUMENTS

JP 2002-142431 5/2002

* cited by examiner

*Primary Examiner*—Dang D Le
(74) *Attorney, Agent, or Firm*—Leydig, Voit & Mayer, Ltd.

(57) ABSTRACT

A housing 25 of a stepping motor 1 consists of a pair of case sections 27 arranged in front and rear in the direction of an axial line L of a rotating shaft 3. The case sections 27 are formed of: an end plate 27a to which a bearing 31 for supporting the rotating shaft 3 is fixed, and a base plate 27b and a top plate 27c extending from the end plate 27a in the direction of axial line L of the rotating shaft 3. The case sections 27 are formed by bending a single plate material.

8 Claims, 30 Drawing Sheets

STEPPING MOTOR

BACKGROUND OF THE INVENTION

1. Field of the Invention

The present invention relates to stepping motor utilized, for example, for driving a camera lens or driving a pickup lens of disk device.

2. Related Background Art

A stepping motor described in Japanese Patent Application Laid-open No. 2002-142431 is an example of a technology of the prior art used in this field. The stepping motor described in this publication is provided with a bearing fixed in a housing, a rotor in which N poles and S poles are alternately magnetized around the outer periphery of a rotating shaft supported by the bearing, a pair of front and rear stators having a plurality of magnetic pole teeth surrounding the rotor, and a cylindrical housing surrounding the stators. This type of stepping motor is suitable for, for example, driving a lens of a camera requiring a desired torque, while also enabling the size of the housing to be reduced.

SUMMARY OF THE INVENTION

Problem to be Solved by the Invention

However, although cylindrical housings of conventional stepping motors are formed by drawing, housings formed by drawing are susceptible to shrinkage and the like. Thus, since wall thickness becomes thinner simultaneous to the drawing diameter becoming smaller as the housing becomes more lightweight and smaller, there were limitations on forming the housing by drawing.

Therefore, an object of the present invention is to provide a stepping motor suitable for reducing the size and weight of a housing.

Means for Solving the Problem

The present invention is a stepping motor comprising: a rotor fixed to a rotating shaft and comprising alternately magnetized N and S poles; a pair of front and rear stators having magnetic pole teeth surrounding the rotor; and a housing surrounding the stators, wherein the housing consists of a pair of case sections arranged in front and rear in an axial direction of the rotating shaft, and the case sections are formed of an end plate to which a bearing for supporting the rotating shaft is fixed, and a plurality of plates extending from the end plate in the axial direction of the rotating shaft, and are formed by bending a single plate material.

According to this stepping motor, since the case sections are formed by bending, there is no occurrence of shrinkage and the like as in the case of drawing, thereby making this suitable for reducing size and weight.

In addition, the present invention is a stepping motor comprising: a rotor fixed to a rotating shaft and comprising alternately magnetized N and S poles; a pair of front and rear stators having magnetic pole teeth surrounding the rotor; and a housing surrounding the stators, wherein the housing consists of a pair of case sections arranged in front and rear in an axial direction of the rotating shaft, the case sections in a developed state comprise: an end plate to which a bearing for supporting the rotating shaft is fixed, a base plate extending from the end plate, and a top plate extending from the end plate in opposition to the base plate, and the base plate and the top plate are formed by bending so that the base plates and top plates are mutually opposed.

According to this stepping motor, the pair of front and rear stators are supported from above and below by the base plates and top plates of the case sections. Moreover, since the case sections are formed by bending so that the base plates and top plates are mutually opposed in a developed state, there is no occurrence of shrinkage and the like as in the case of drawing, thereby making this suitable for reducing size and weight.

Preferably, the case sections in a developed state, further comprise side plates protruding from the base plates and side plates protruding from the top plates, the side plates on the base plate side are formed by bending towards the inside of the housing at an obtuse angle between the base plates and the side plates, and the side plates on the top plate side are formed by bending towards the inside of the housing at an obtuse angle between the top plates and the side plates. The pair of front and rear stators are supported from the side by the side plates of the base plates and the side plates of the top plates. Moreover, since the side plates are formed by bending at an obtuse angle from the base plates and the top plates, the side plates protruding from the base plates and the side plates protruding from the top plates can be separated easily. As a result of this separation, openings can be made to appear in both sides of the housing composed of the pair of case sections, the width of the housing can be shortened by the amount of these openings in the direction perpendicular to the axial line of the rotating shaft, and the heat generated by a coil can be released to the outside from these openings.

Moreover, a plurality of terminal boards protruding from the housing are preferably separated by top plates. The plurality of terminal boards are accurately positioned by top plates and are prevented from shifting out of position.

Moreover, a projection provided on the end of one of the base plates arranged in the axial direction and an indentation provided in the end of the other base plate are preferably engaged. Since ends of the base plates are accurately positioned by the engagement of the projection and indentation, the assembly accuracy of the housing composed of a pair of case sections is improved.

Moreover, clamps spread to the outside extending in the axial direction are preferably provided on the end of the projection and the end of the top plate. Since the ends of the base plates and the ends of the top plates are clamped by these clamps, the ends of the base plates and the ends of the top plates are prevented from shifting out of position in a direction perpendicular to the rotating shaft, thereby improving the assembly accuracy of the housing.

Moreover, at least one of contacting positions of the ends of the base plates and contacting positions of the ends of the top plates is shifted farther in the axial direction than the boundary position of the magnetic pole teeth in the axial direction. Since both stators can be installed between the base plates and top plates extending beyond the boundary position of the magnetic pole teeth during assembly of the motor, both stators can be positioned accurately thereby improving assembly work efficiency.

Moreover, a reinforcing rib extending in the axial direction is preferably provided on at least one of the base plate and top plate. This is effective for reducing the size of the housing since strength can be secured by providing this reinforcing rib even if the diameter of the housing decreases as a result of reducing size.

Moreover, a bearing clamp protruding to the outside is preferably provided on the outer surface of the end plate, and the bearing is preferably held on the end plate by the bearing clamp on the outer surface of the end plate. The sizes of the stator and rotor can be increased in the axial direction as a result of installing the bearing on the outside, thereby making it possible to increase motor output.

An annular magnetic insulating spacer is further provided arranged between the pair of stators arranged in the axial direction, and a notch into which the top plates are inserted is preferably provided in the periphery of the spacer. Since the spacer that magnetically insulates the stators is positioned by the top plates, the spacer is prevented from shifting out of position.

EFFECT OF THE INVENTION

The stepping motor of the present invention is suitable for reducing the size and weight of a housing.

BRIEF DESCRIPTION OF THE REFERENCE SYMBOLS 1, 40, 80: stepping motor, 3: rotating shaft, 5: rotor, 7A, 7B: stator, 8: insulating magnetic spacer, 8a: notch, 17A, 17B: outer yoke magnetic pole teeth, 19A, 19B: inner yoke magnetic pole teeth, 22A, 22B, 87A, 87B: terminal board, 25, 41: housing, 27, 43, 51, 61, 71, 81: front case section, 27a, 43a, 51a, 61a, 71a, 81a: front case section end plate, 27b, 43b, 51b, 61b, 71b, 81b: front case section base plate, 27c, 43c, 51c, 61c, 71c, 81c: front case top plate, 27d, 43d, 51d, 61d, 71d, 81d: front case first side plate, 27e, 43e, 51e, 61e, 71e, 81e: front case section second side plate, 27f, 43f, 51f, 61f, 71f, 81f: front case section third side plate, 27g, 43g, 51g, 61g, 71g, 81g: front case section fourth side plate, 27k: reinforcing rib, 29, 45, 82: rear case section, 29a, 45a, 82a, rear case section end plate, 29b, 45b, 82b: rear case section base plate, 29c, 45c, 82c: rear case section top plate, 29d, 45g, 82d: rear case section first side plate, 29e, 45h, 82e: rear case section second side plate, 29f, 45j, 82f: rear case section third side plate, 29g, 45k, 82g: rear case section fourth side plate, 27j, 43j: indentation, 29j, 45d: projection, 45e, 45f: clamp, 51m, 51n, 61m, 61n: bearing supports (bearing clamp), 71j: cylindrical section (bearing clamp), P1: contact position, CP: boundary position: BL: bending line, OS: opening, L: axial line.

DESCRIPTION OF THE PREFERRED EMBODIMENTS

The following provides a detailed explanation of preferred embodiments of the stepping motor as claimed in the present invention with reference to the drawings.

First Embodiment

As shown in FIGS. 1 to 5 and FIG. 30, the external dimensions of a stepping motor 1 consist of a diameter and width of about 4 mm and total length of about 8 mm thus realizing compact size, and this stepping motor 1 is used for driving a camera lens, pickup lens of disk device and the like.

Figure 5:
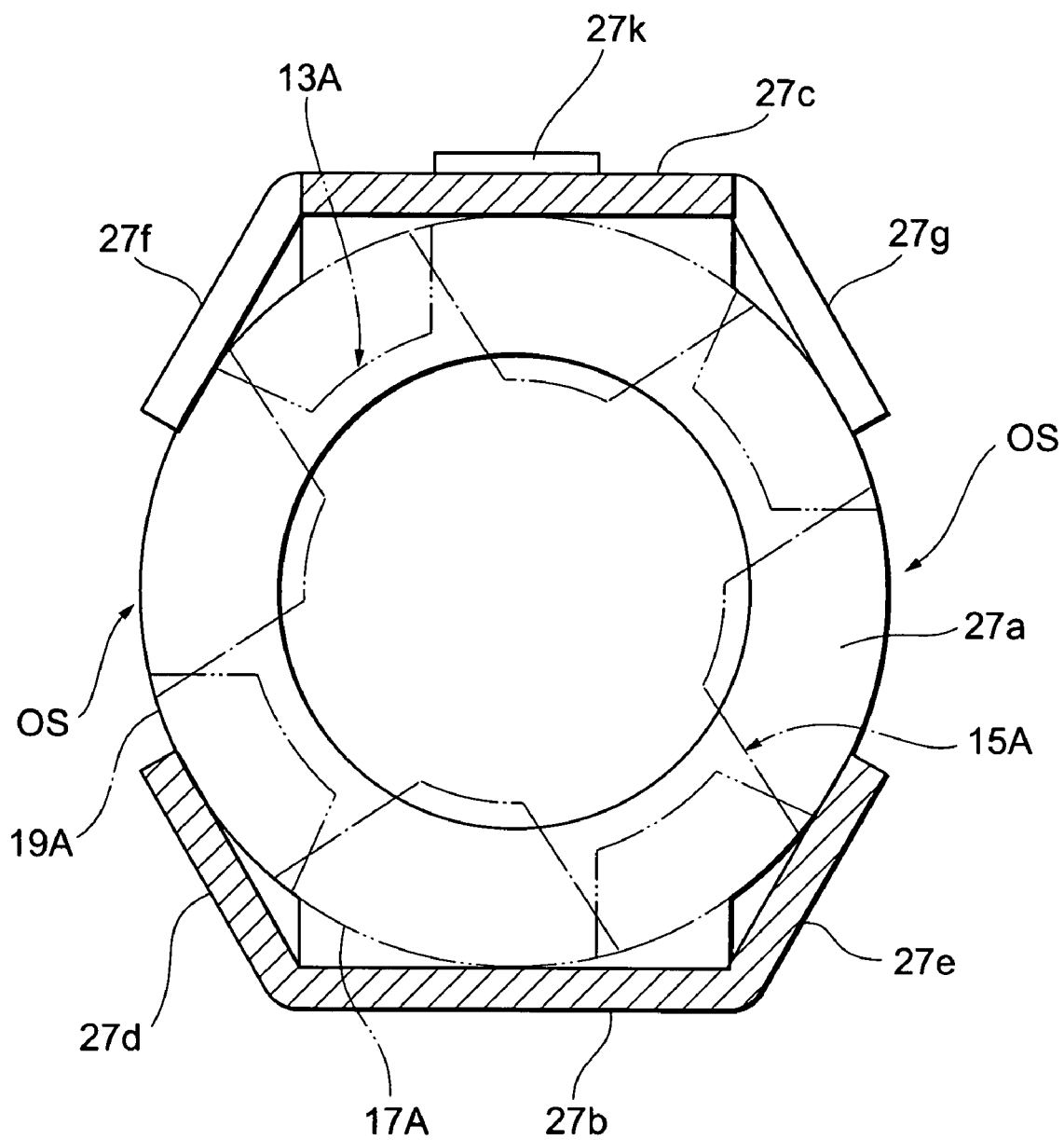
FIG. 5 is a cross-sectional view taken along line V-V of FIG. 4.

This type of compact stepping motor 1 has a rotating shaft 3 measuring 0.5 to 1 mm in diameter and a rotor 5 comprised of a permanent magnet in which N poles and S poles are alternately magnetized at equal intervals in the circumferential direction on the outer periphery of this rotating shaft 3 (see FIG. 5). Moreover, a pair of stators 7A and 7B are arranged to the front and rear of rotor 5 in the direction of axial line L of rotating shaft 3. Washers are mounted to the rotating shaft 3 between one end of rotor 5 and the front stator 7A and between the other end of rotor 5 and the rear stator 7B. Moreover, together with the rotor 5 being inserted between the front rotor 7A and the rear rotor 7B, and an annular magnetic insulating spacer 8 that magnetically insulates the front stator 7A and the rear stator 7B is arranged there between.

The front stator 7A composes a magnetic circuit with a coil 9A and a yoke 11A that houses the coil 9A. Yoke 11A is composed of an outer yoke 13A and inner yoke 15A, both made of iron, and outer yoke 13A and inner yoke 15A are connected so as to compose a magnetic circuit through a sleeve for rotatably supporting rotating shaft 3. Outer yoke 13A has four magnetic pole teeth 17A in the form of a comb extending in the direction of axial line L from the edge of a disk-shaped base 14A (see FIG. 4), and inner yoke 15A has four magnetic pole teeth 19A in the form of a comb extending in the direction of axial line L from the edge of a disk-shaped base 16A.

Yoke 11A is arranged in close proximity to coil 9A, and base 14A of outer yoke 13A and base 16A of inner yoke 15A are arranged to the outside and inside of coil 9A respectively in the direction of axial line L, while also being arranged mutually in parallel with coil 9A being positioned there between. Moreover, magnetic pole teeth 17A and magnetic pole teeth 19A are positioned roughly mutually concentrically so as to surround rotor 5. In a motor 1 having such a constitution, since coil 9A and rotor 5 are arranged together in the direction of axial line L, the outer diameter of stepping motor 1 can be reduced.

Next, a brief explanation is provided of the constitution of stator 7B since it has a similar constitution to that of stator 7A. Outer stator 7B composes a magnetic circuit with a coil 9B and a yoke 11B housing coil 9B. Yoke 11B is composed of an outer yoke 13B and an inner yoke 15B, both made of iron, and outer yoke 13B and inner yoke 15B are connected in the manner of a magnetic circuit through a sleeve. The outer yoke 13B and the inner yoke 15B have four magnetic pole teeth 17B and four magnetic pole teeth 19B in the manner of a comb extending in the direction of axial line L from the edge of a disk-shaped base 14B and disk-shaped base 16B.

Moreover, a terminal unit 21A is arranged to the outside of stator 7A. Terminal unit 21A has a pair of plastic terminal boards 22A separated to the left and right, and coil wires 9a protruding from coil 9A are connected to terminals 23A protruding in a direction perpendicular to a direction from terminal boards 22A to a top plate 27c (to be subsequently described in detail). Together with constituting an air core coil, this coil 9A is held by a plastic bobbin 20A (see FIG. 13) integrally formed with terminal boards 22A of terminal unit 21A. Current from an external power supply is supplied to coil 9A through terminals 23A of terminal unit 21A.

Moreover, a terminal unit 21B is arranged to the outside of stator 7B. Terminal unit 21B has a pair of plastic terminal boards 22B separated to the left and right, and coil wires 9b protruding from coil 9B are connected to terminals 23B protruding in a direction perpendicular to a direction from terminal boards 22B to a top plate 29c (to be subsequently described in detail). Together with constituting an air core coil, this coil 9B is held by a plastic bobbin 20B integrally formed with terminal boards 22B of terminal unit 21B.

In the pair of stators 7A and 7B composed in this manner, magnetic pole teeth 17A, 19A, 17B and 19B are arranged so as to oppose the outer peripheral surface of rotor 5, and magnetic pole teeth 17A of stator 7A and magnetic pole teeth 17B of stator 7B are shifted out of position by a predetermined angle without coinciding with the direction of axial line L. Magnetic pole teeth 19A of stator 7A and magnetic pole teeth 19B of stator 7B are also shifted out of position by a predetermined angle. Rotor 5 can be rotated in steps by sequentially switching the direction of the current flowing to coils 9A and 9B through terminal units 21A and 21B, thereby allowing rotating shaft 3 to also rotate in steps accompanying the rotation thereof.

In this manner, since stepping motor 1 is provided with rotor 5 fixed to rotating shaft 3, and a pair of stators 7A and 7B, provided in a row to the front and rear of the rotor 5 in the axial direction L of the rotating shaft 3, which house a pair of coils 9A and 9B within yokes 11A and 11B, respectively, reduction in size is achieved that is suitable for driving a camera lens or driving a pickup lens of disk device.

Moreover, stepping motor 1 has a non-magnetic housing 25 for housing the pair of front and rear stators 7A and 7B and the rotor 5. This housing 25 is composed of a pair of case sections 27 and 29 arranged to the front and rear in the direction of axial line L of rotating shaft 3. The front case section 27 and the rear case section 29 are formed by bending a stainless steel plate material punched out to a predetermined shape.

Figure 6:
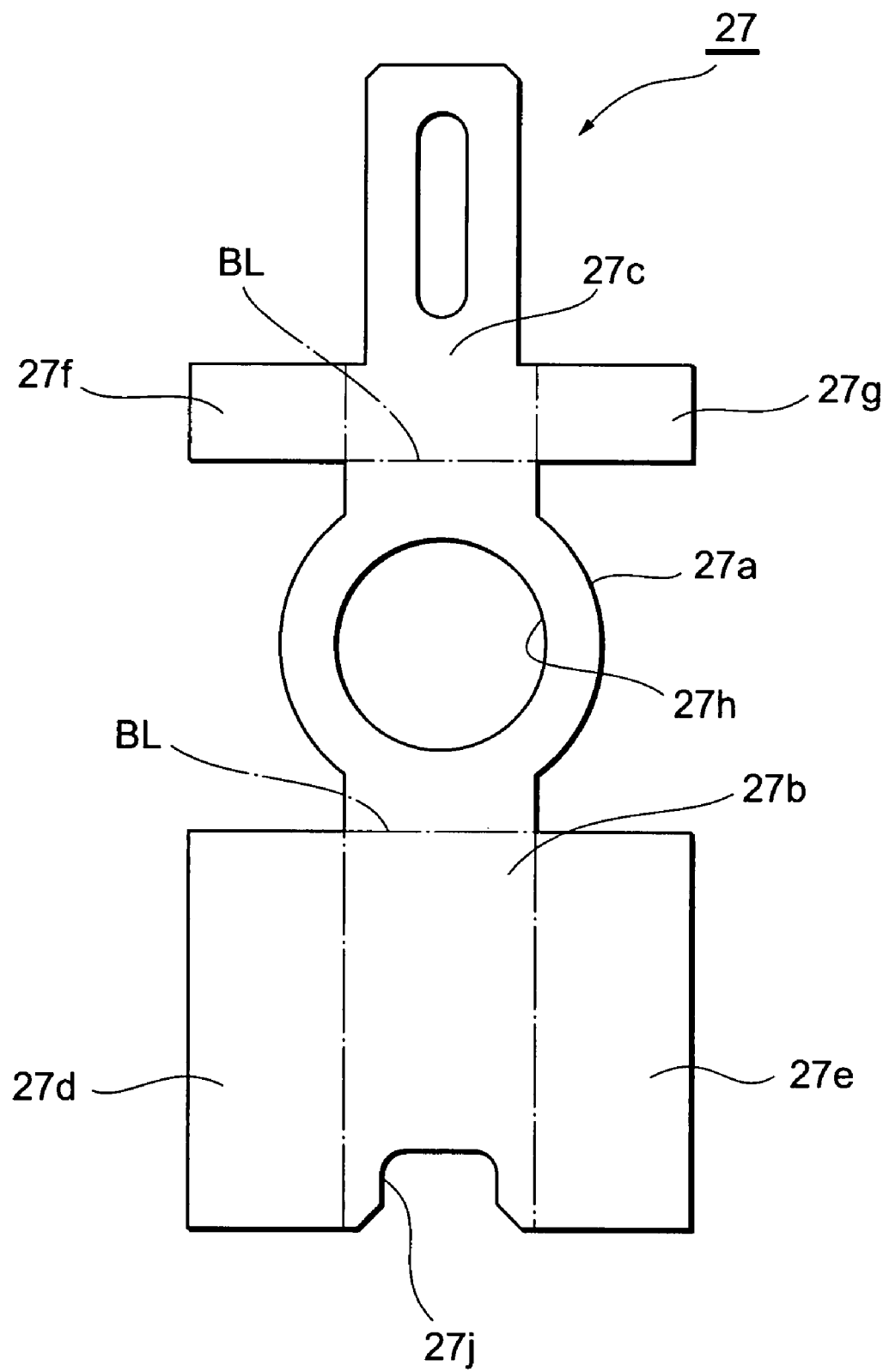
FIG. 6 is a development view of a front case section.
Figure 7:
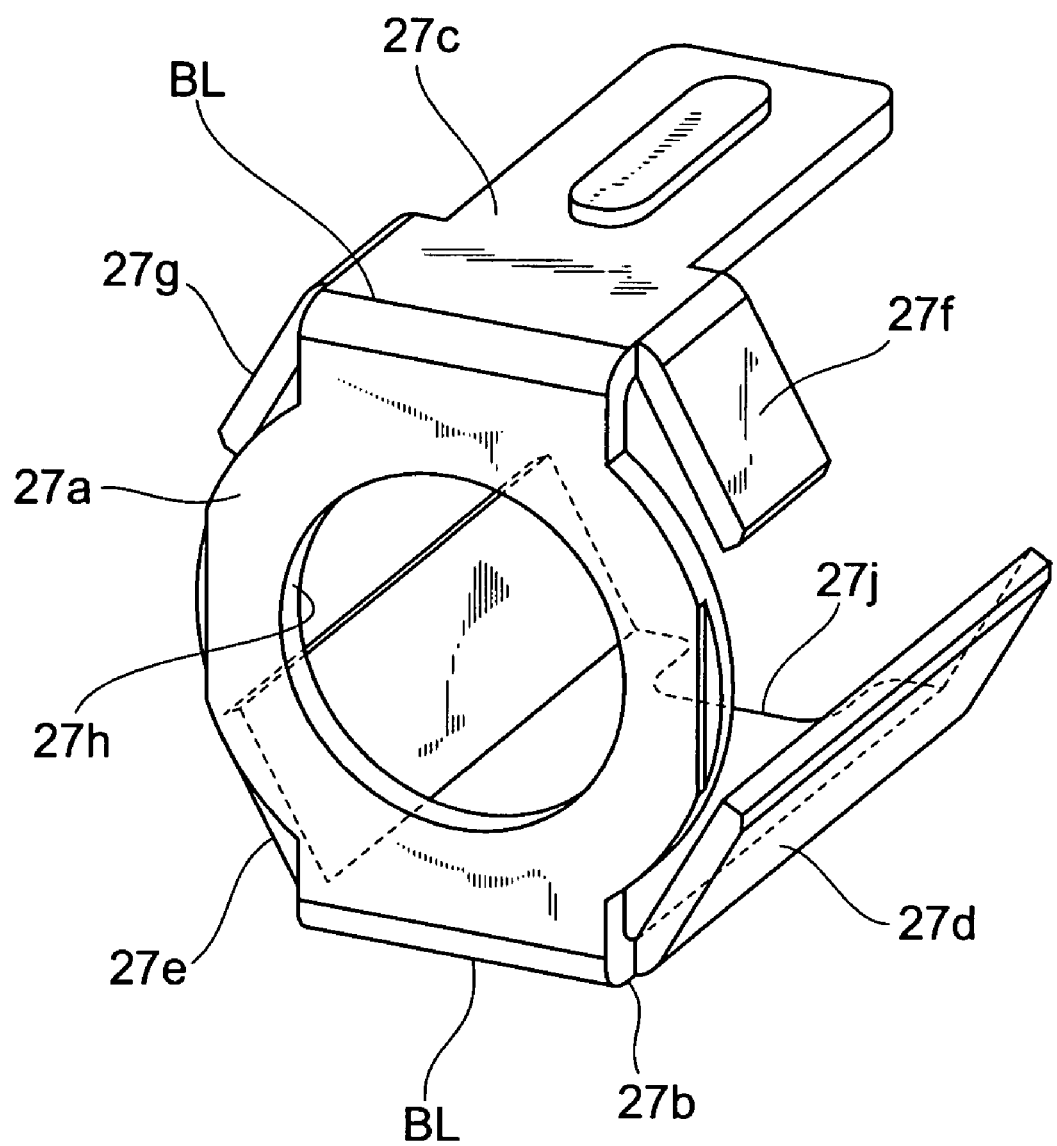
FIG. 7 is a perspective view of a front case section.
Figure 8:
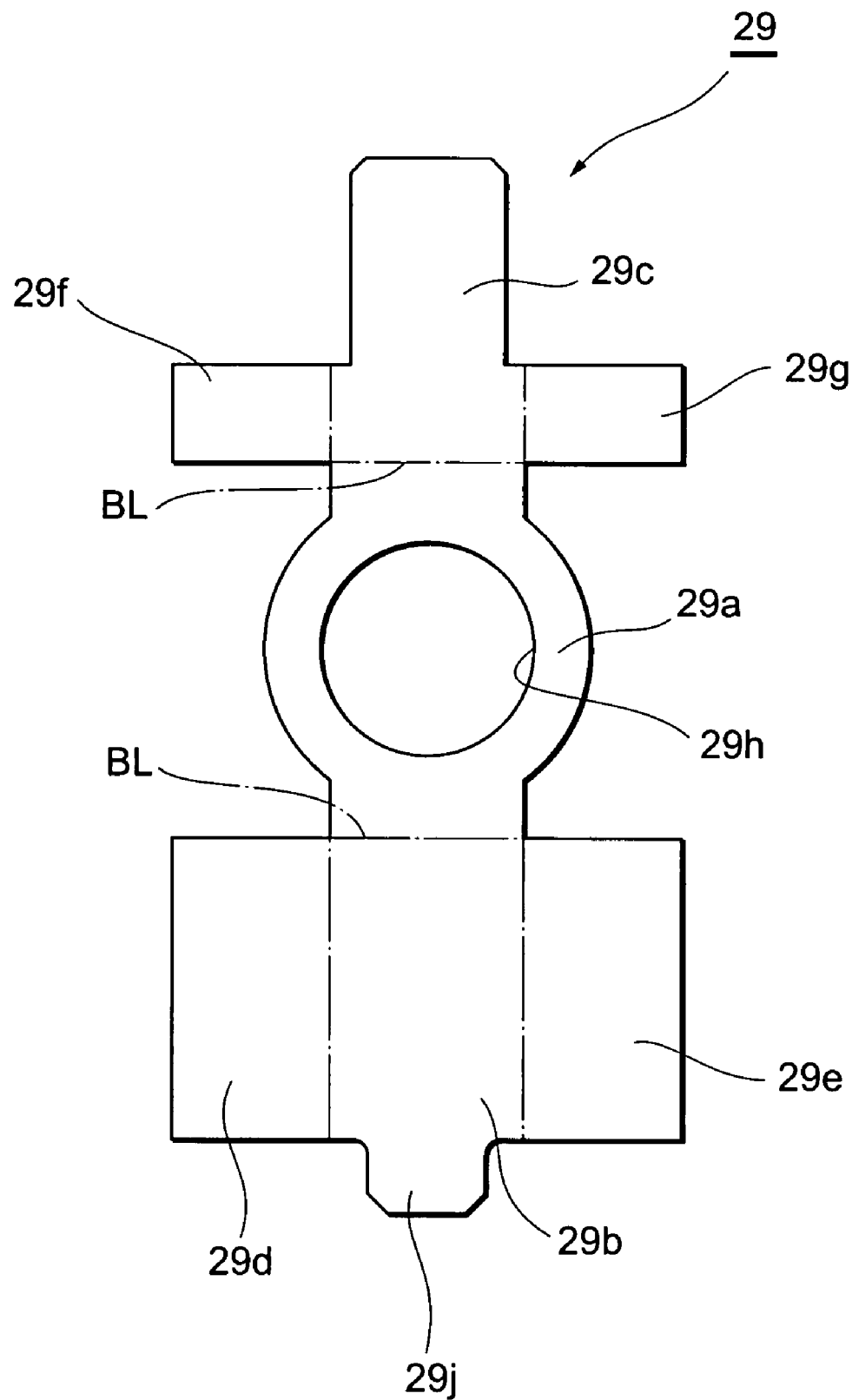
FIG. 8 is a development view of a rear case section.
Figure 9:
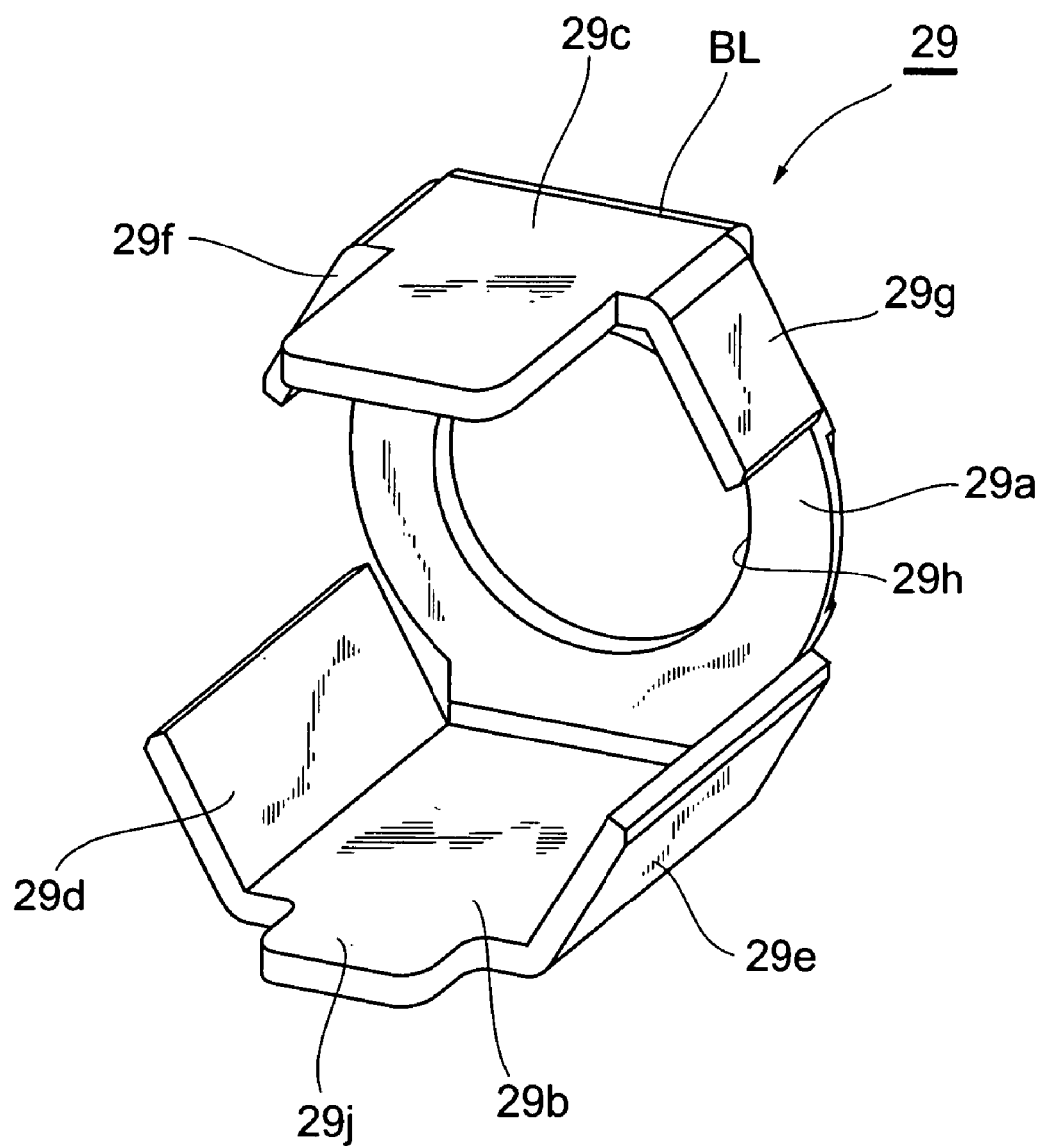
FIG. 9 is a perspective view of a rear case section.

As shown in FIGS. 6 and 7, front case section 27 in a developed state is composed of a single plate, and is provided with an end plate 27a to which a front bearing 31 is fixed for supporting rotating shaft 3, a flat base plate 27b extending from end plate 27a, and a flat top plate 27c extending from end plate 27a in opposition to base plate 27b. The front case section 27 is formed by bending at a right angle at a linear bending line BL between end plate 27a and base plate 27b, and bending at a right angle at linear bending line BL between end plate 27a and top plate 27c. Base plate 27b and top plate 27c are bent so as to be in mutual opposition and parallel, and base plate 27b and top plate 27c extend in the direction of axial line L of rotating shaft 3 from end plate 27a.

Moreover, front case section 27 in a developed state is provided with first and second side plates (base plate side plates) 27d and 27e protruding to both sides perpendicular to base plate 27b, and third and fourth side plates (top plate side plates) 27f and 27g protruding to both sides perpendicular to top plate 27c. The first and second side plates 27d and 27e extend along base plate 27b from the proximal end to the distal end of base plate 27b. The third and fourth side plates 27f and 27g protrude perpendicularly from the proximal end sides of top plate 27c to form roughly the shape of the letter T with the top plate 27c. The first and second side plates 27d and 27e are bent to an obtuse angle (e.g., 120 degrees) between the base plate 27b and the first and second side plates 27d and 27e so as to be inclined towards the inside of housing 25. In addition, the third and fourth side plates 27f and 27g are bent to an obtuse angle (e.g., 120 degrees) between the top plate 27c and the third and fourth side plates 27f and 27g so as to be inclined towards the inside of housing 25. Moreover, a gap is formed between the first side plate 27d and the third side plate 27f by separating the ends thereof. Similarly, a gap is also formed between the second side plate 27e and the fourth side plate 27g by separating the ends thereof.

Figure 10:
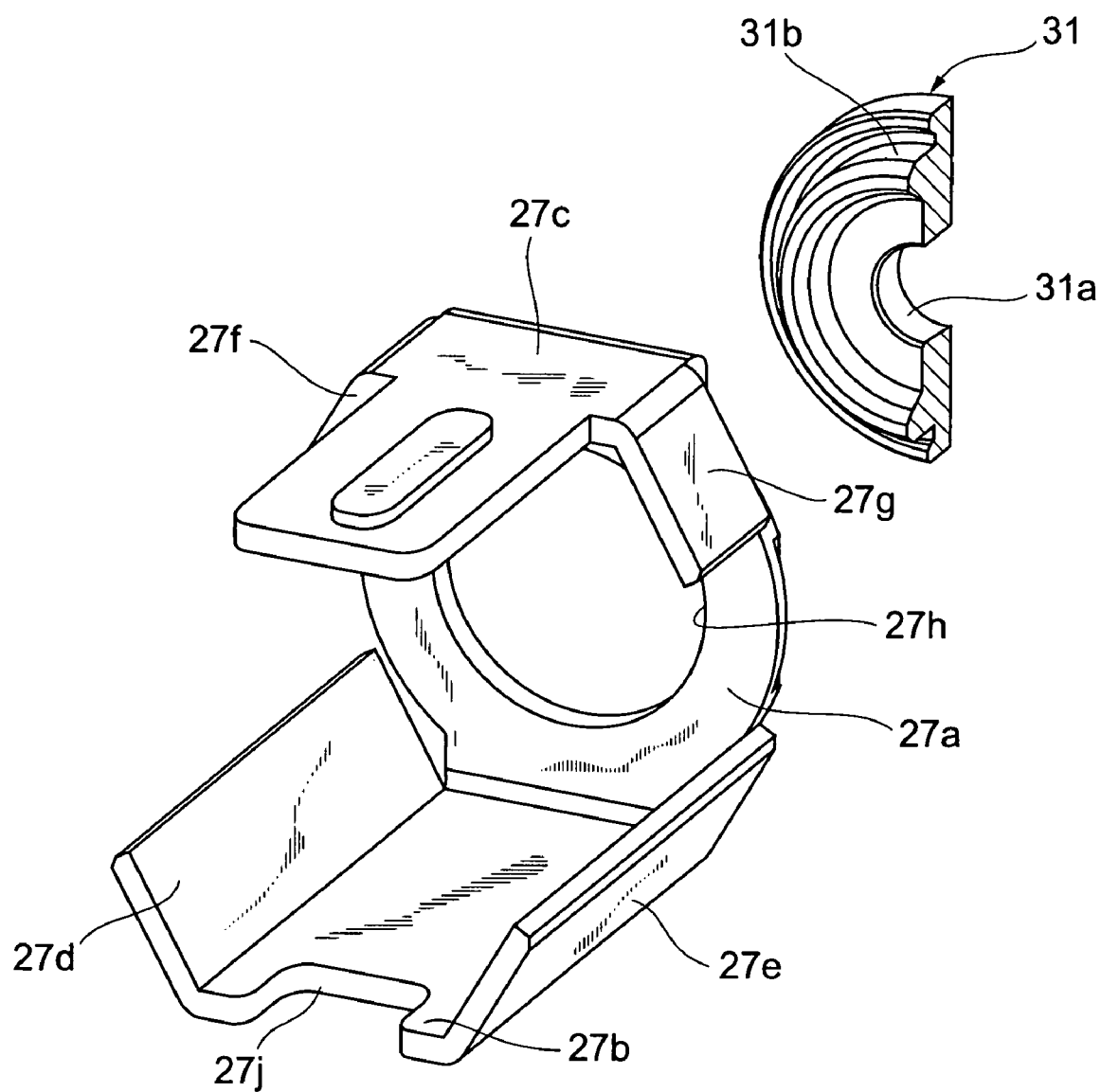
FIG. 10 is an exploded perspective view showing a front case section and a bearing.
Figure 11:
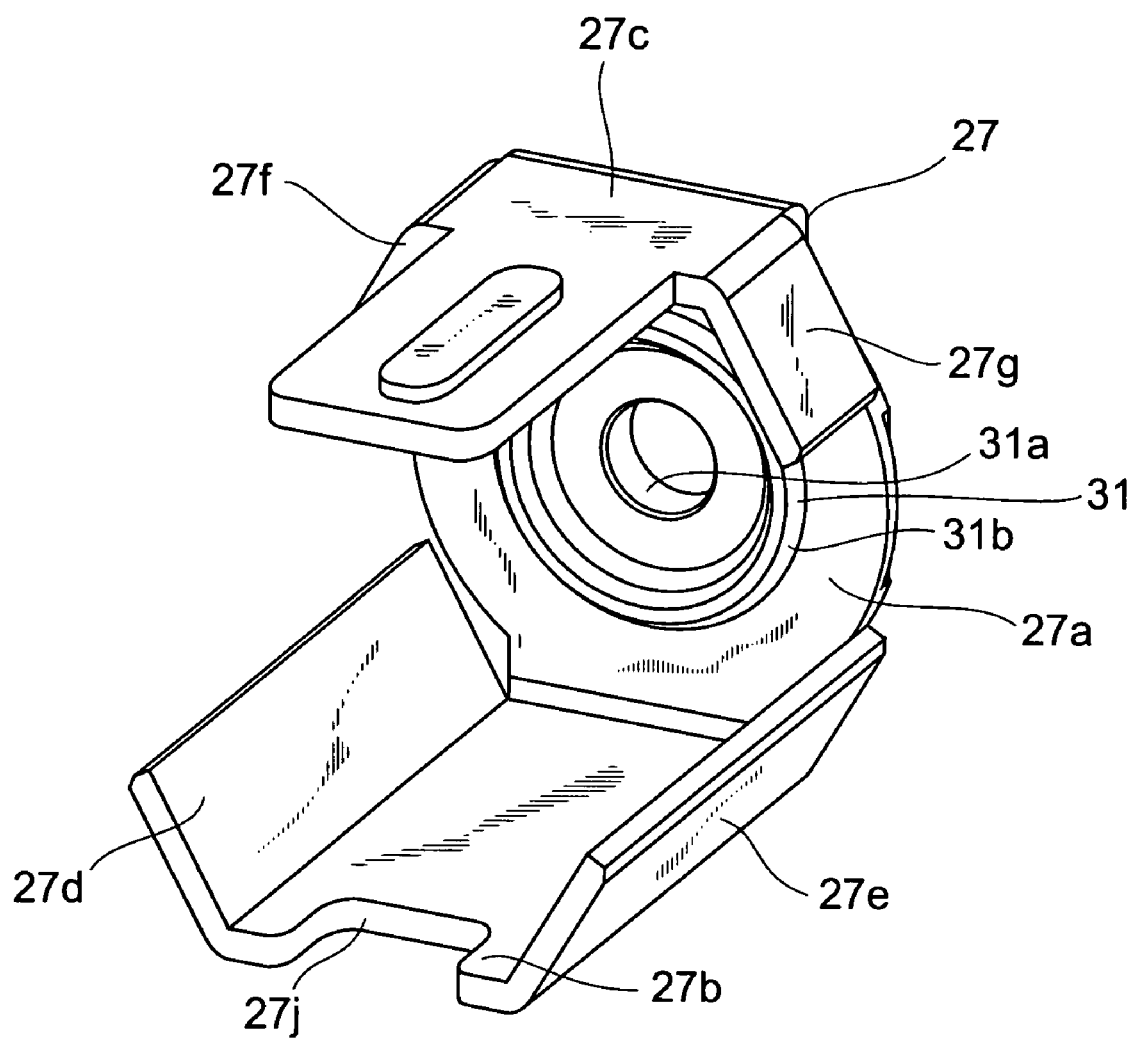
FIG. 11 is a perspective view showing a front case section to which a bearing is attached.

A circular hole 27h for fixing bearing 31 is formed in the center of end plate 27a. As shown in FIGS. 10 and 11, bearing 31 has a center hole 31a into which rotating shaft 3 is inserted, and an annular engagement portion 31b protruding from the end surface that contacts end plate 27a and corresponding to the size of circular hole 27h. Engagement portion 31b of bearing 31 is inserted into circular hole 27h, and engagement portion 31b exposed from the inside of end plate 27a is fixed to end plate 27a by riveting. Since the center hole 31a of bearing 31 is required to be provided with slidability, that provided with a plating having superior lubricity on a pure iron surface is used.

Rear case section 29 in a developed state is composed of a single plate, and is provided with an end plate 29a to which a rear bearing 33 is fixed for supporting rotating shaft 3, a base plate 29b extending from end plate 29a, a flat top plate 29c extending from end plate 29a in opposition to base plate 29b, first and second side plates (base plate side plates) 29d and 29e protruding to both sides from base plate 29b, and third and fourth side plates (top plate side plates) 29f and 29g protruding to both sides from top plate 29c. The rear case section 29 is formed by bending in the same manner as the front case section 27, and base plate 29b and top plate 29c extend in the direction of axial line L of rotating shaft 3 from end plate 29a. Moreover, a circular hole 29h is formed in end plate 29a, and bearing 33 is fixed to end plate 29a by riveting in the same manner as front case 27 (see FIG. 4).

As shown in FIGS. 6 to 10, an indentation 27j cut out to a rectangular shape is formed in the end of base plate 27b of front case section 27, and a projection 29j that engages with an indentation 27j protrudes from the end of base plate 29b of rear case section 29. As shown in FIGS. 1 to 4, when assembling housing 25, together with contacting the ends of base plates 27b and 29b of both case sections 27 and 29 while engaging indentation 27j and projection 29j, the ends of top plates 27c and 29c are also contacted with each other. The corresponding ends of base plates 27b and 29b and the corresponding ends of top plates 27c and 29c are then joined by welding. Since the ends of base plates 27b and 29b are accurately positioned by engaging indentation 27j and projection 29j, the assembly accuracy of housing 25 composed of front case section 27 and rear case section 29 is improved.

Figure 4:
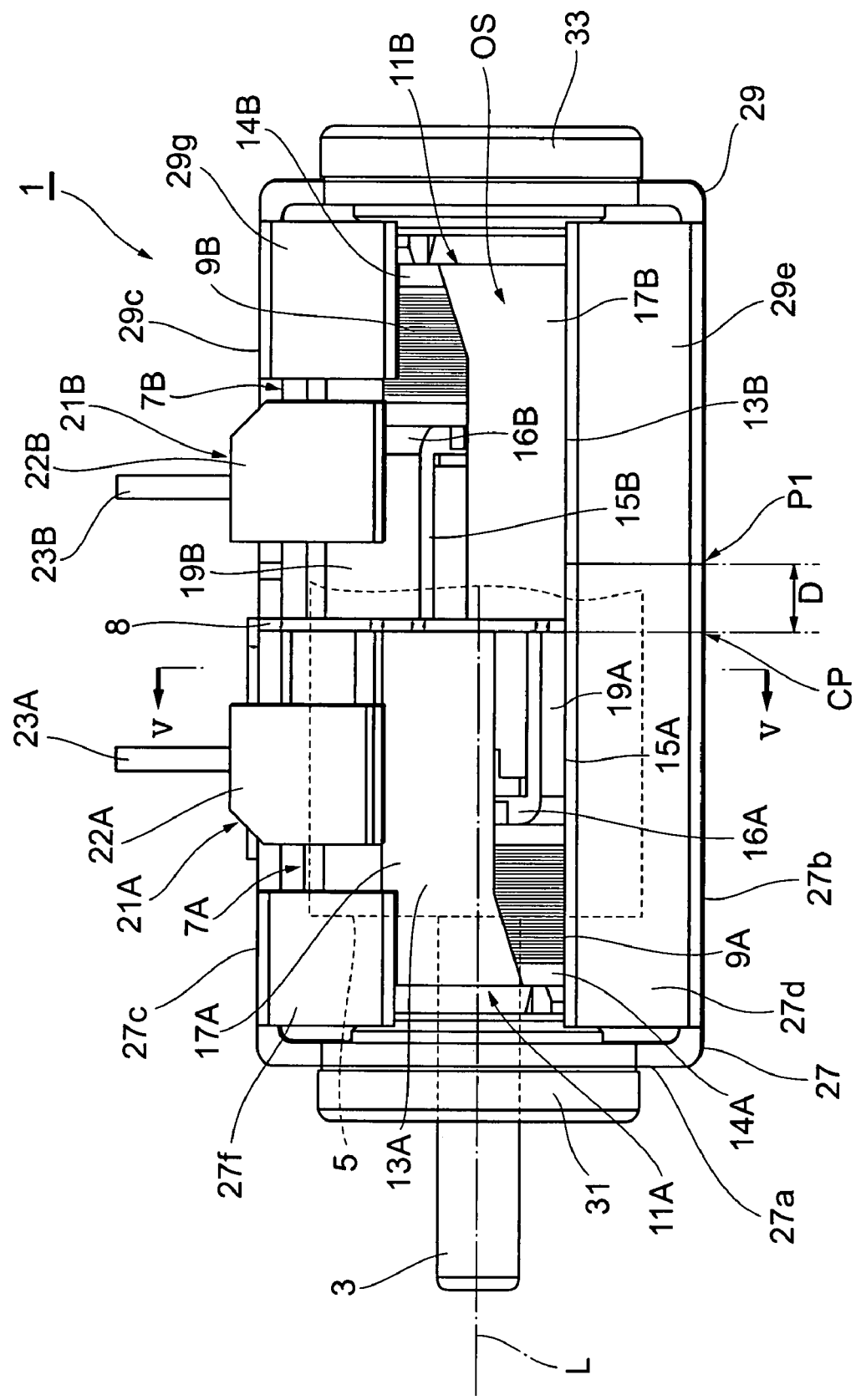
FIG. 4 is a side view of the stepping motor shown in FIG. 1.

Moreover, as shown in FIG. 4, base plate 27b of front case section 27 is longer in the direction of axial line L of rotating shaft 3 than base plate 29b of rear case section 29, the position P1 where contact is made between base plates 27b and 29b is shifted farther towards the rear than boundary position CP between magnetic pole teeth 17A and 19A and magnetic pole teeth 17B and 19B by a deviation D. In addition, top plate 27c of front case section 27 is also longer in the direction of axial line L of rotating shaft 3 than top plate 29c of rear case section 29, and the position where contact is made between top plates 27c and 29c is shifted farther towards the rear than boundary position CP between magnetic pole teeth 17A and 19A and magnetic pole teeth 17B and 19B. During assembly of stepping motor 1, since both stators 7A and 7B can be installed between base plate 27b and top plate 27c of front case section 27 extending beyond the boundary position CP of magnetic pole teeth 19A and 19B, both stators 7A and 7B can be positioned accurately, thereby making it possible to improve assembly work efficiency.

As shown in FIG. 5, base plate 27b contacts magnetic pole teeth 17A of outer yoke 13A of stator 7A to support stator 7A from below. Moreover, first and second side plates 27d and 27e formed by being bent at an obtuse angle from base plate 27b contact magnetic pole teeth 19A of inner yoke 15A to support stator 7A from the sides. Base plate 29b of rear case section 29 and first and second side plates 29d and 29e are similar, with base plate 29b contacting magnetic pole teeth 17B of outer yoke 13B of stator 7B to support stator 7B, and first and second side plates 29d and 29e contacting magnetic pole teeth 17A of outer yoke 13A and magnetic pole teeth 19B of inner yoke 15B to support stator 7B from the sides.

Moreover, top plate 27c contacts magnetic pole teeth 17A of outer yoke 13A of stator 7A to support stator 7A from above. Moreover, third and fourth side plates 27f and 27g formed by being bent at an obtuse angle from top plate 27c contact magnetic pole teeth 17A of outer yoke 13A to support stator 7A from the sides. Top plate 29c of rear case section 29 and third and fourth side plates 29f and 29g are similar, with top plate 29c contacting magnetic pole teeth 17B of outer yoke 13B of stator 7A to support stator 7B, and third and fourth side plates 29f and 29g contacting magnetic pole teeth 17B of outer yoke 13A to support stator 7B from the sides.

Side plates 27d, 27e, 29d and 29e of base plates 27b and 29b are separated from side plates 27f, 27g, 29f and 29g of top plates 27c and 29c, and as a result of this separation, openings OS can be made to appear in both sides of housing 25 composed of a pair of case sections 27 and 29. The use of these openings OS makes it possible to reduce the width of housing 25 by the amount of these openings OS in a direction perpendicular to axial line L of rotating shaft 3, while also enabling heat generated by coils 9A and 9B to be released to the outside. Since case sections 27 and 29 are formed by bending, shrinkage and the like that occur during drawing do not occur, thereby making this suitable for reducing size and weight.

Figure 12:
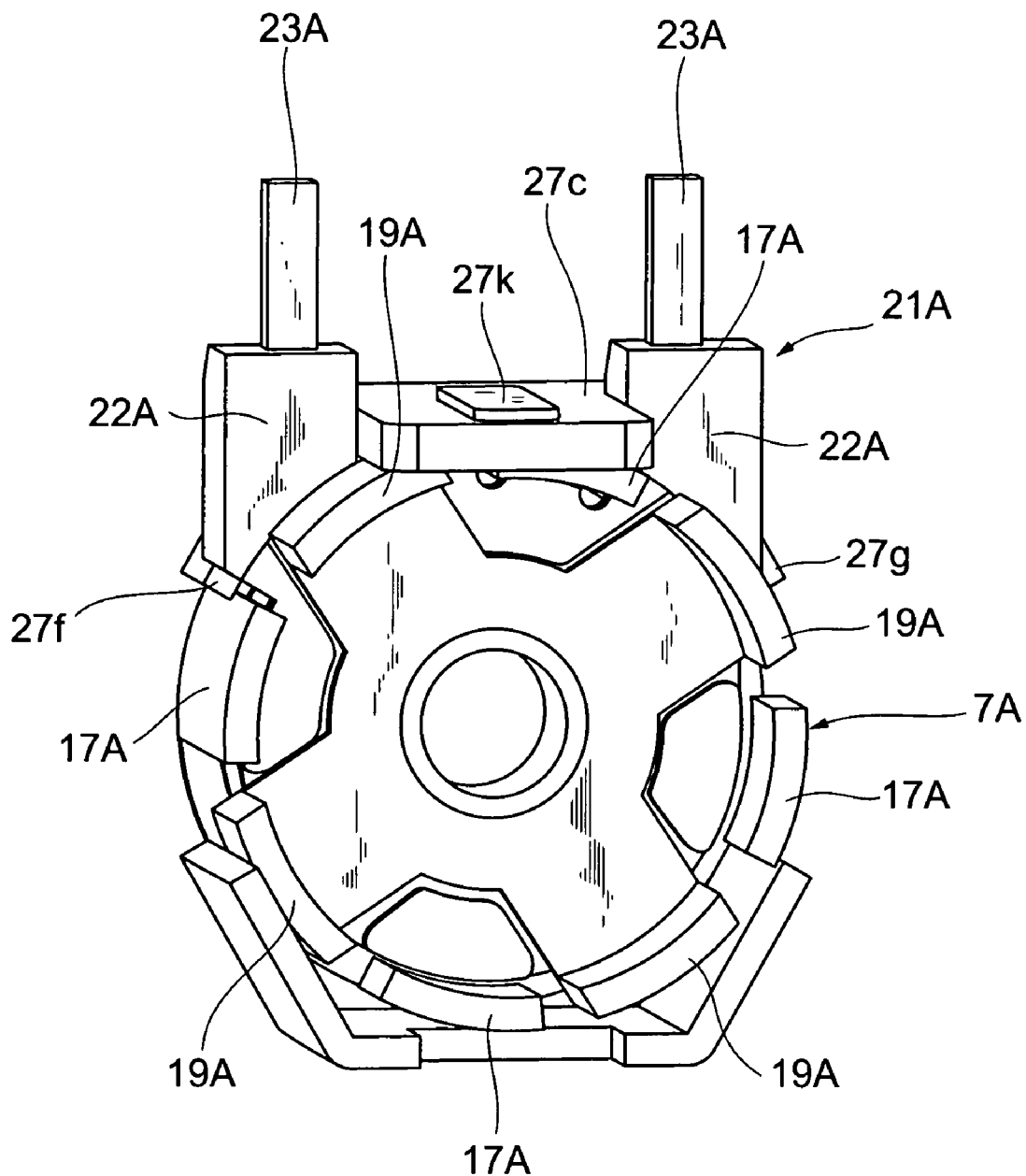
FIG. 12 is a perspective view showing a front case section installed with a stator and a terminal board.
Figure 13:
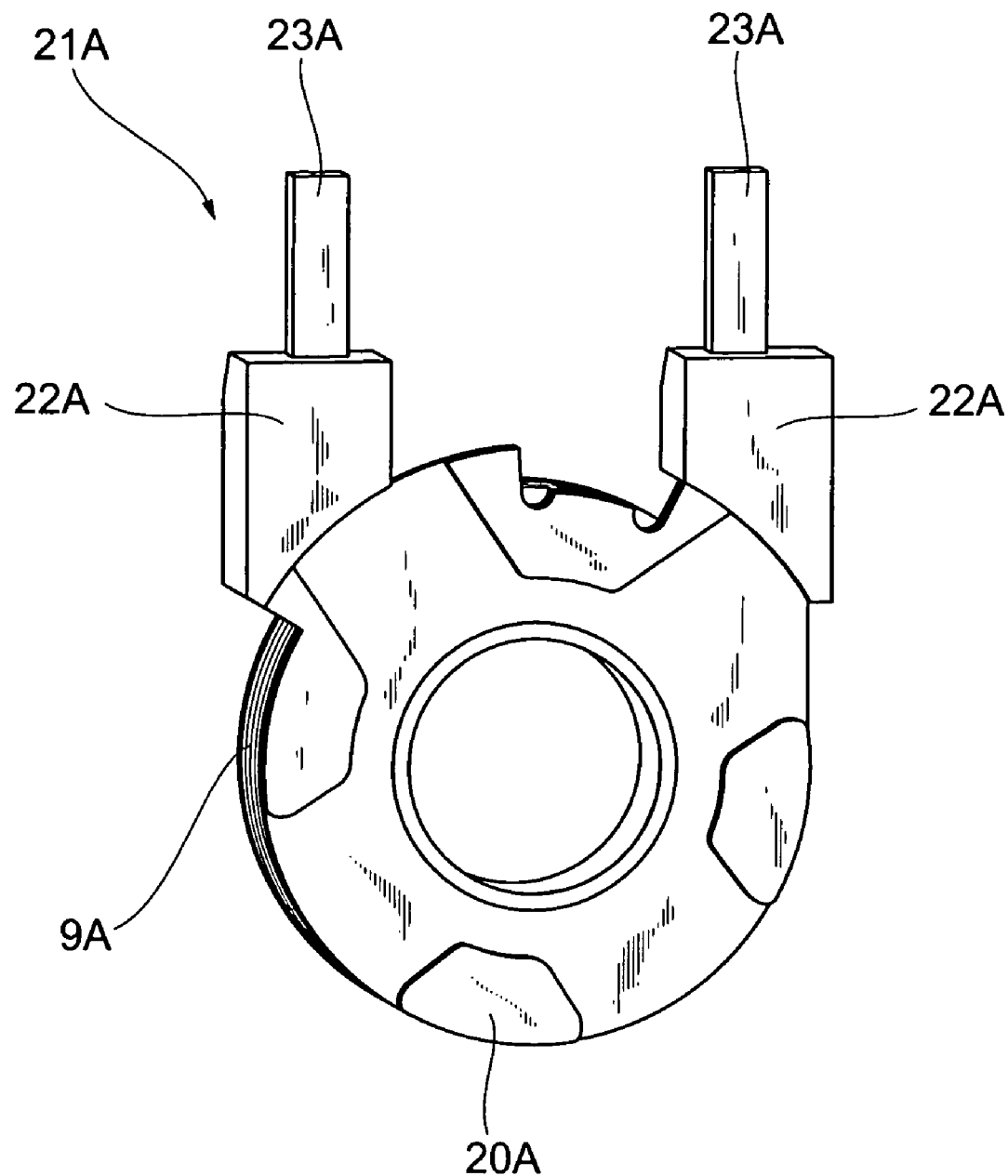
FIG. 13 is a perspective view of a bobbin and terminal board holding a coil.

As shown in FIGS. 12 and 13, terminal boards 22A separated to the left and right of terminal unit 21A are divided by top plate 27c of front case section 27, are exposed in the gaps to the rear of third and fourth side plates 27f and 27g, and are accurately positioned by top plate 27c. Similarly, terminal boards 22B separated to the right and left of terminal unit 21B are divided by top plate 29c of rear case section 29, exposed from the gaps in front of third and fourth side plates 29f and 29g, and are accurately positioned by top plate 29c. Furthermore, since top plates 27c and 29c are positioned between the pair of terminal boards 22A and the pair of terminal boards 22B from the left and right, strain in the case of being subjected to external force is decreased and they become resistant to external force.

Figure 1:
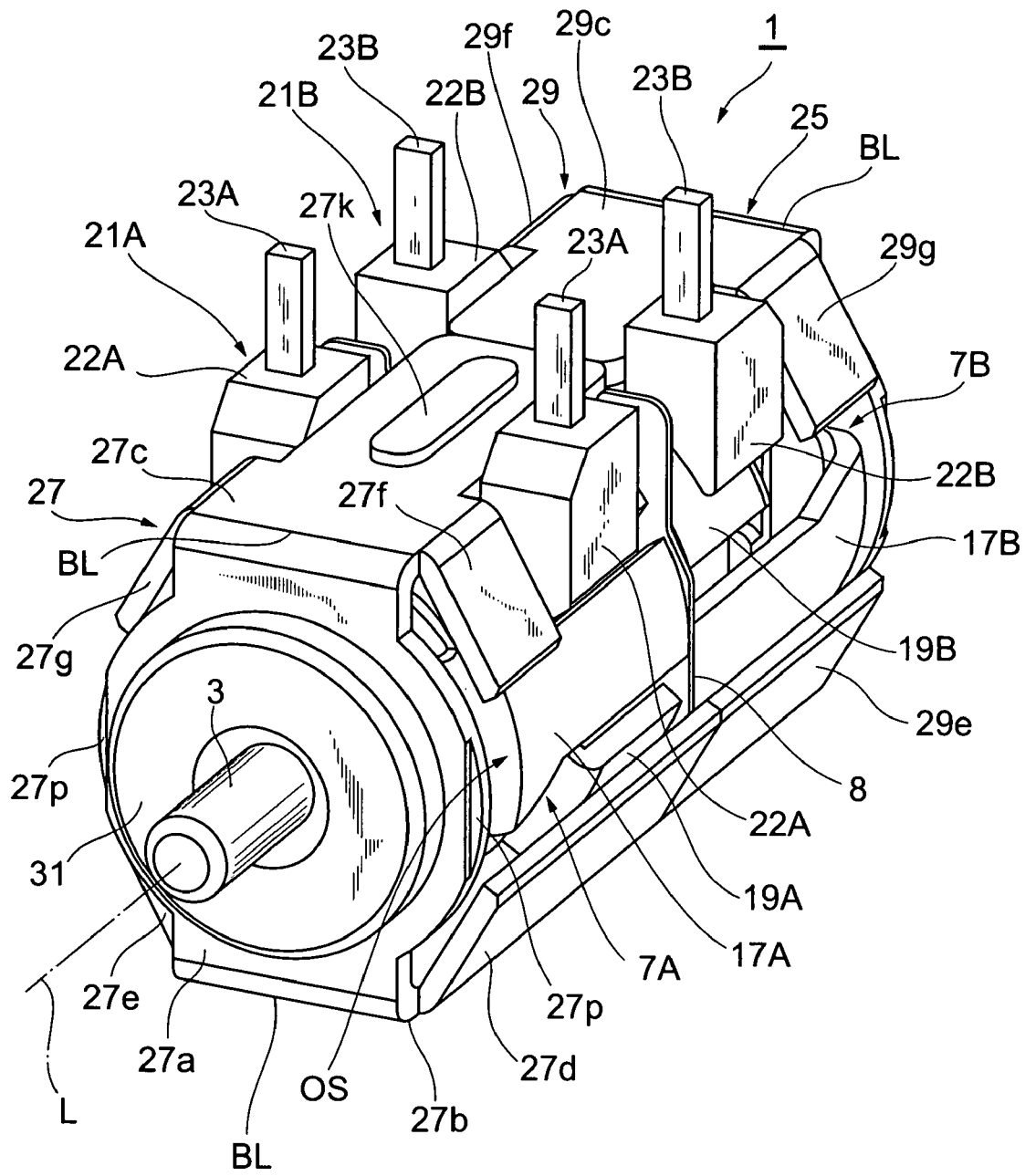
FIG. 1 is a perspective view as viewed from the front of a first embodiment of a stepping motor as claimed in the present invention.

Moreover, as shown in FIG. 1, a reinforcing rib 27k extending in the direction of axial line L of rotating shaft 3 is provided on top plate 27c. Strength can be secured by providing reinforcing rib 27k even if the diameter of housing 25 decreases due to reduction in size, thereby making this effective for reducing size.

Figure 14:
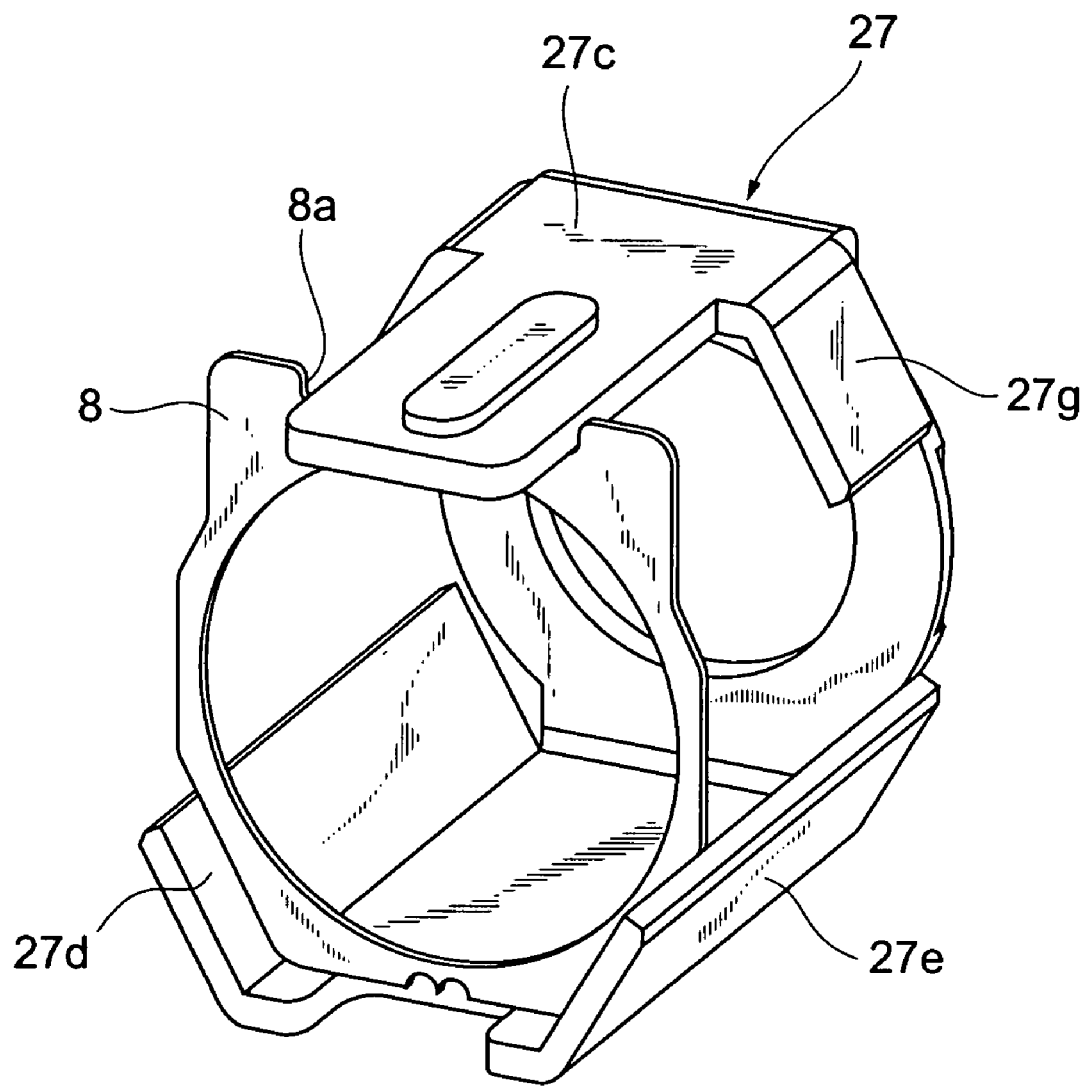
FIG. 14 is a perspective view showing a front stator and a magnetic insulating spacer.
Figure 15:
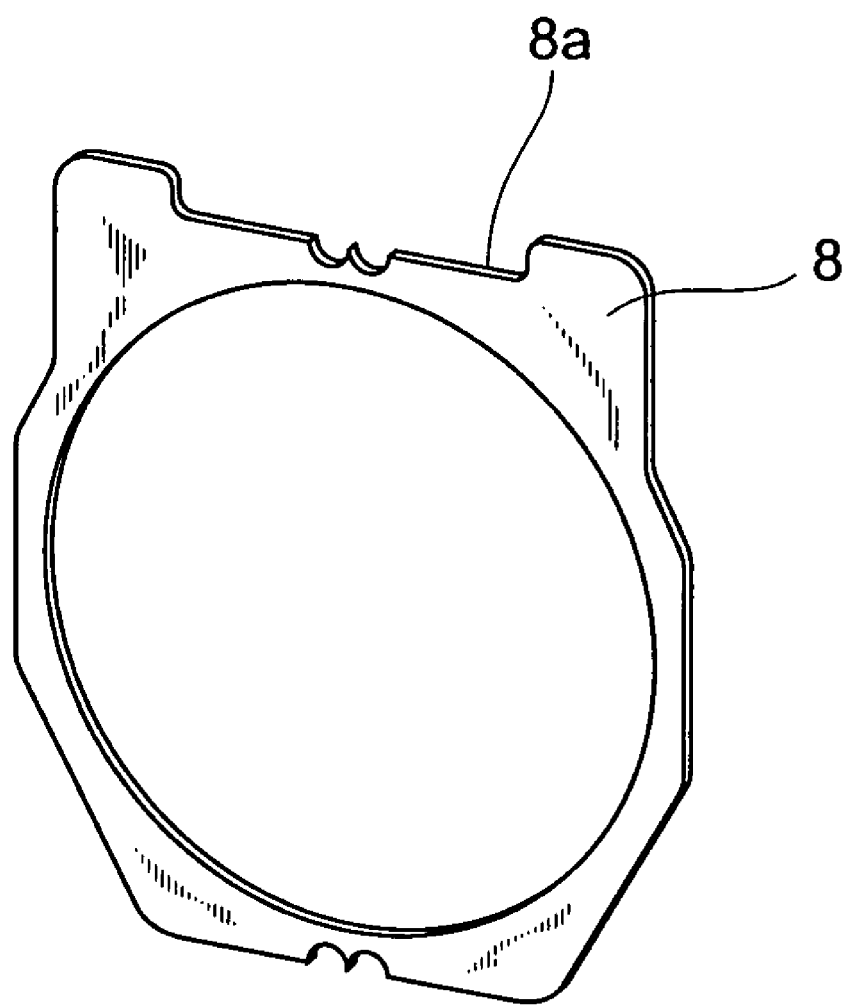
FIG. 15 is a perspective view showing a magnetic insulating spacer.

Moreover, as shown in FIGS. 14 and 15, annular magnetic insulating spacer 8 made of plastic for magnetically insulating the pair of front and rear stators 7A and 7B is provided between the stators 7A and 7B (see FIG. 1). A notch 8a into which top plate 27c is inserted is provided in spacer 8, and spacer 8 is positioned and prevented from shifting out of position by top plate 27c.

Figure 2:
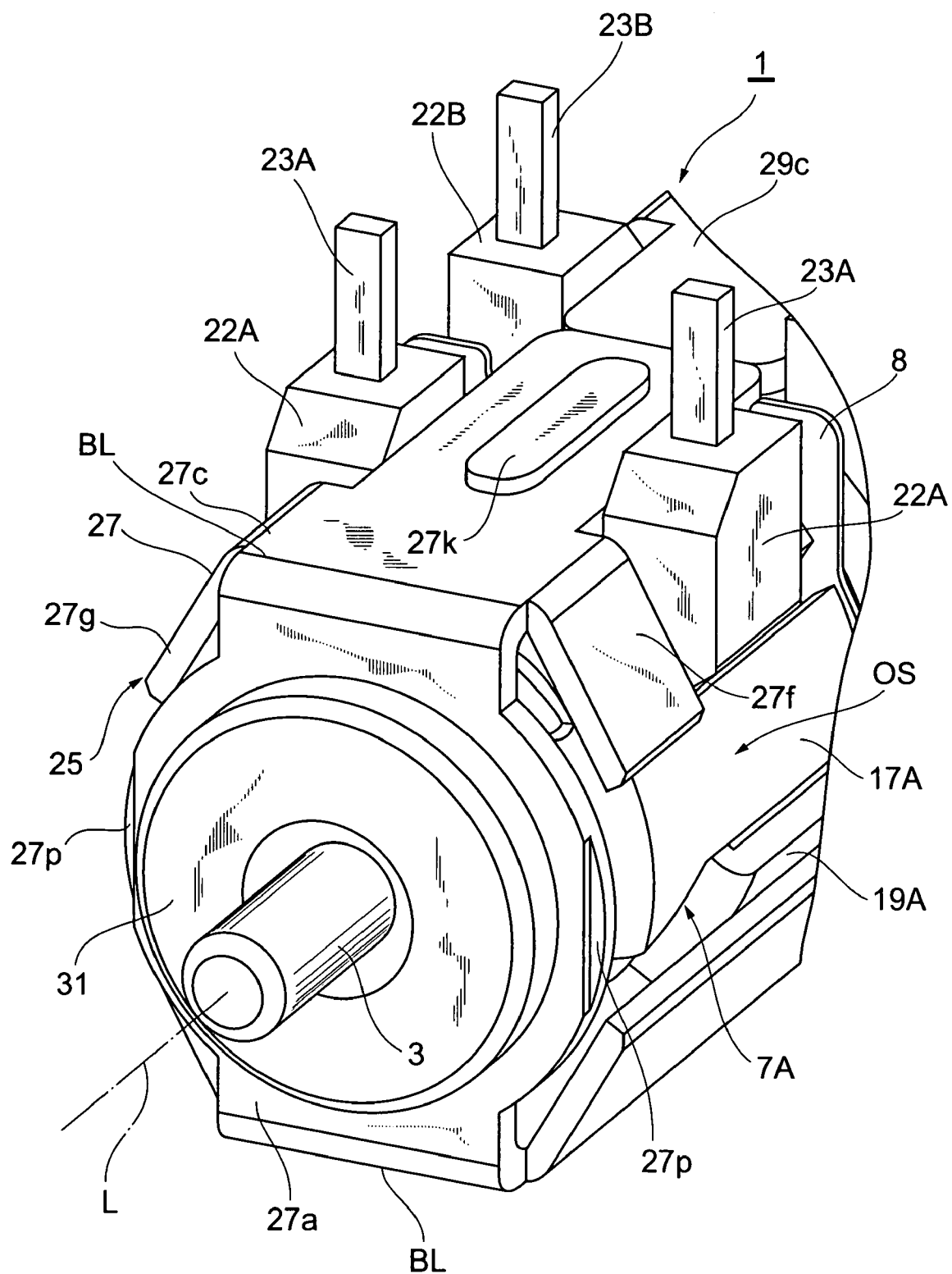
FIG. 2 is an enlarged perspective view of the front of the stepping motor shown in FIG. 1.
Figure 3:
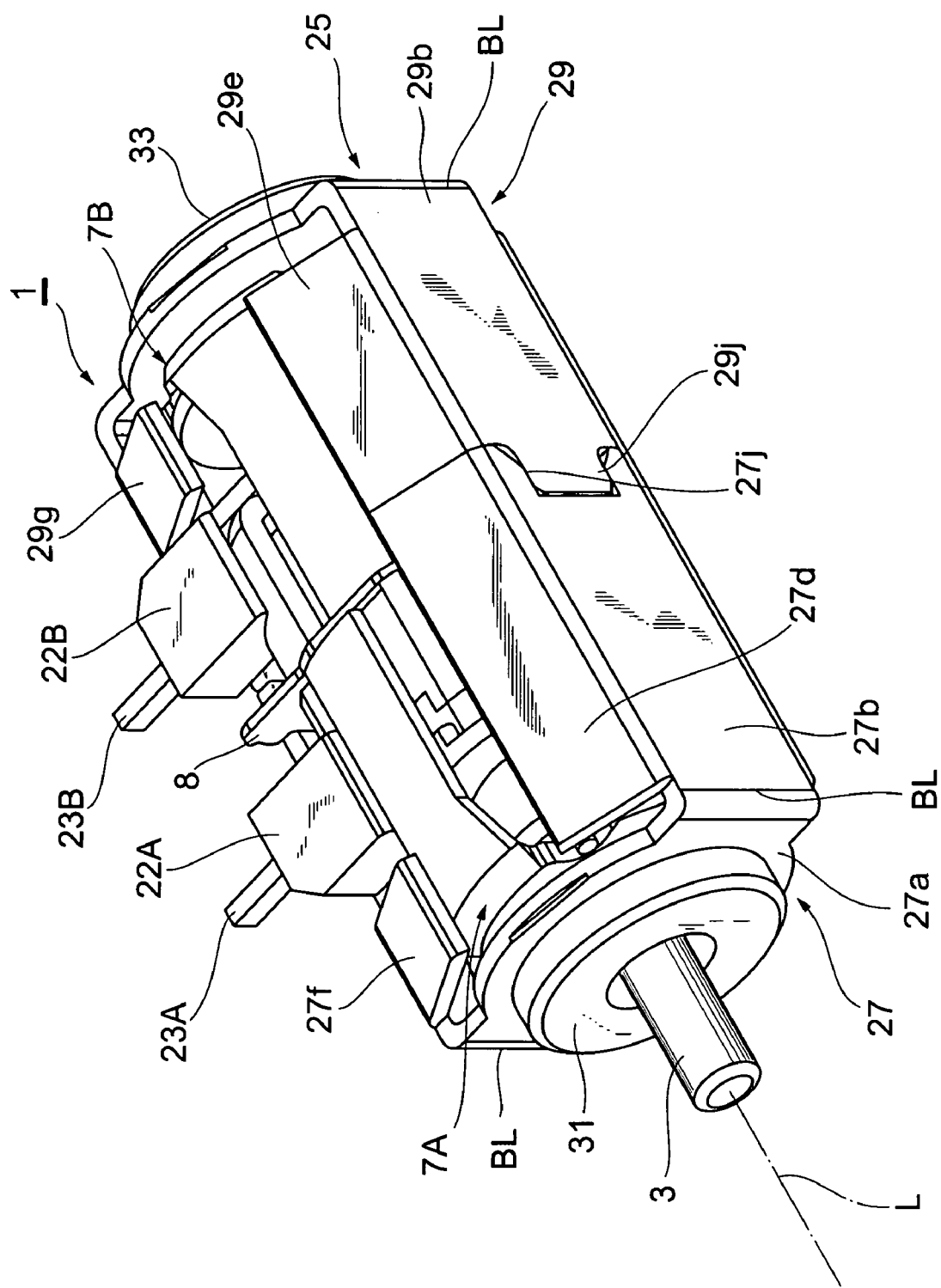
FIG. 3 is a perspective view as viewed from the bottom of the stepping motor shown in FIG. 1.

Moreover, as shown in FIG. 2, step-like depressions 27p are provided on both sides of the outer surface of end plate 27a of front case section 27. These depressions 27p are able to inhibit wear between stepping motor 1 attached to a circuit board and an external moving substrate, while also making it possible to ease the effects of damage and so forth of peripheral components in the case of having contacted such peripheral components. Furthermore, fillets and chamfering are performed on the ends of side plates 27d, 27e, 27f, 27g, 29d, 29e, 29f and 29g as well for the same purpose.

Second Embodiment

Next, an explanation is provided of a stepping motor 40 as claimed in a second embodiment. Furthermore, the explanation focuses only on those aspects of stepping motor 40 that are different from the stepping motor 1 as claimed in the first embodiment, and the same reference symbols are used to indicate those constituents employing the same constitution as stepping motor 1, the explanation thereof being omitted.

Figure 16:
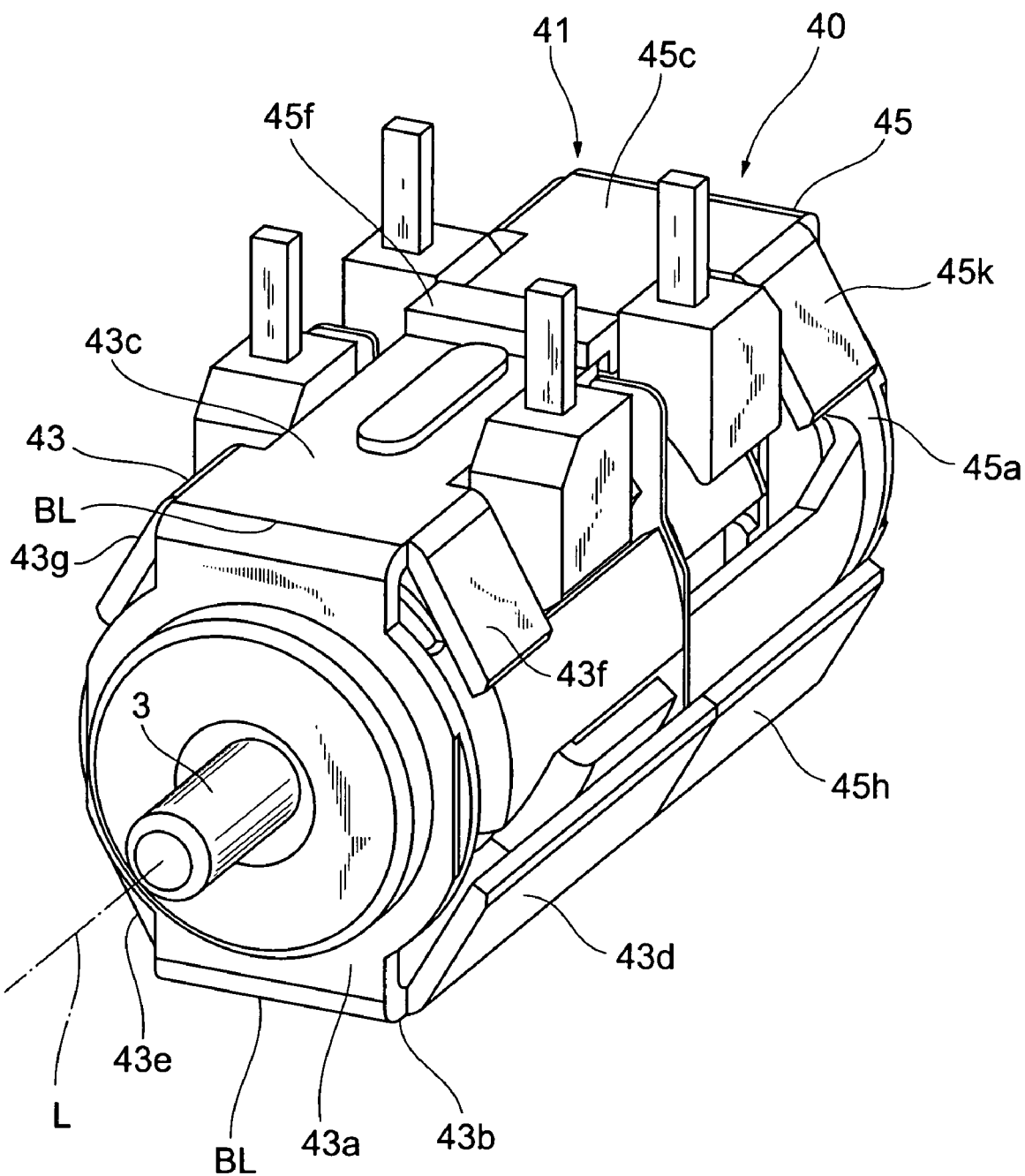
FIG. 16 is a perspective view showing a second embodiment of a stepping motor as claimed in the present invention.
Figure 17:
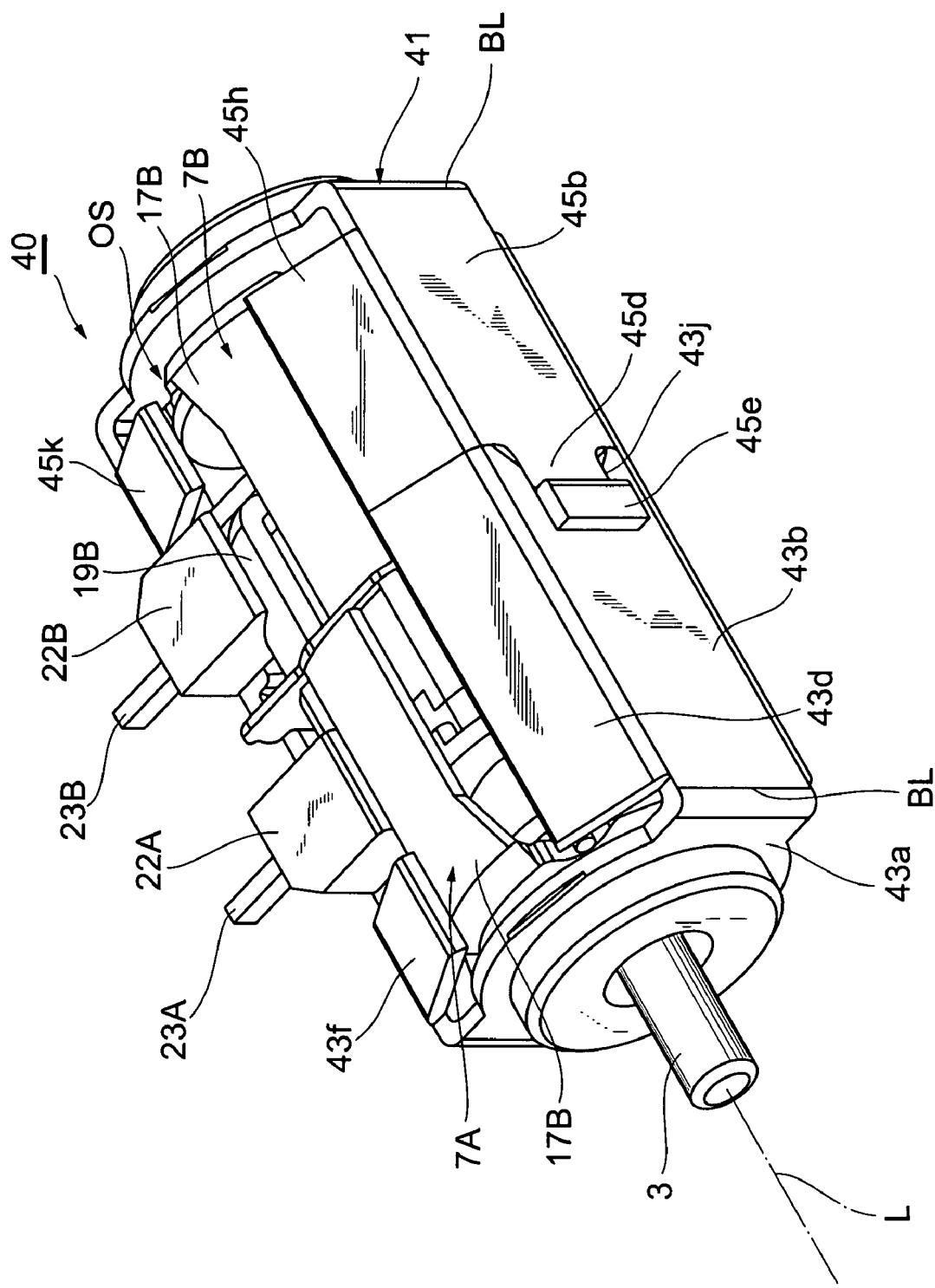
FIG. 17 is a perspective view as viewed from the bottom of the stepping motor as claimed in a second embodiment.
Figure 18:
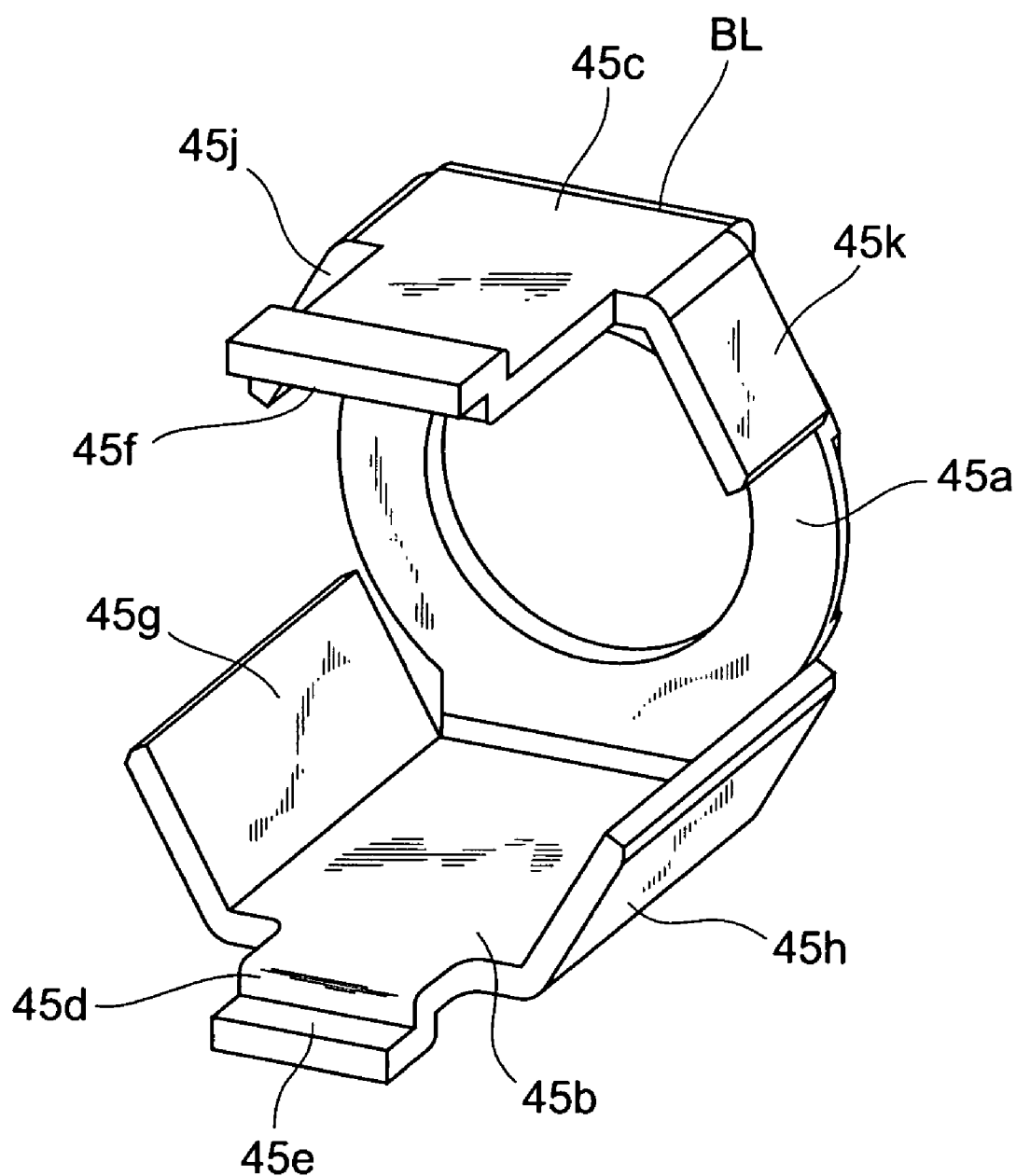
FIG. 18 is a perspective view of a rear case section of a stepping motor as claimed in a second embodiment.

As shown in FIGS. 16 to 18, a housing 41 of stepping motor 40 is composed of a pair of case sections 43 and 45 arranged in a row to the front and rear in the direction of axial line L of rotating shaft 3. The front case section 43 and the rear case section 45 are formed by bending a single stainless steel plate material punched out to a predetermined shape. Furthermore, similar to the front case section 27 of stepping motor 1 of the first embodiment, front case section 43 has an end plate 43a, base plate 43b, top plate 43c, first and second side plates (base plate side plates) 43d and 43e, and third and fourth side plates (top plate side plates) 43f and 43g, and an indentation 43j is formed in the end of base plate 43b.

The rear case section 45 in a developed state is provided with an end plate 45a to which a rear bearing 47 is fixed for supporting rotating shaft 3, a flat base plate 45b extending from end plate 45a, and a flat top plate 45c extending from end plate 45a in opposition to base plate 45b. The rear case section 45 is formed by bending at a right angle at a linear bending line BL between end plate 45a and base plate 45b, and is formed by bending at a right angle at a linear bending line BL between end plate 45a and top plate 45c. Moreover, a projection 45d that engages with the indentation 43j formed in base plate 43b of front case section 43 is formed on base plate 45b. Clamps 45e and 45f bent so as to spread to the outside and extending in the direction of axial line L of rotating shaft 3 are provided on the end of top plate 45c and the end of projection 45d. Moreover, rear case section 45 has first and second side plates 45g and 45h and third and fourth side plates 45j and 45k in the same manner as stepping motor 1.

During assembly of housing 41, the ends of base plates 43b and 45b of both case sections 43 and 45 are contacted while engaging indentation 43j and projection 45d, and the ends of top plates 43c and 45c are also contacted. Moreover, indentation 43j of base plate 43b and the end of top plate 43c of front case section 43 are clamped between clamps 45e and 45f of rear case section 45. As a result, the ends of base plates 43b and 45b and the ends of top plates 43c and 45c are prevented from easily shifting out of position in the direction perpendicular to rotating shaft 3, thereby improving the assembly accuracy of housing 41.

Similar to stepping motor 1, side plates 43d, 43e, 45g and 45h on base plates 43b and 45b and side plates 43f, 43g, 45j and 45k on top plates 43c and 45c are also separated in stepping motor 40, as a result of this separation, openings OS can be made to appear in both sides of housing 41 composed of the pair of case sections 43 and 45, the width of housing 41 can be reduced by the amount of these openings OS in a direction perpendicular to axial line L of rotating shaft 3, and heat generated by coils 9A and 9B can be released to the outside. Since case sections 43 and 45 are formed by bending, shrinkage and the like that occur during drawing do not occur, thereby making this suitable for reducing size and weight.

Third Embodiment

Next, an explanation is provided of a stepping motor as claimed in a third embodiment. Furthermore, the explanation focuses only on those aspects of the stepping motor of the third embodiment that are different from the stepping motor 1 as claimed in the first embodiment, and the same reference symbols are used to indicate those constituents employing the same constitution as stepping motor 1, the explanation thereof being omitted.

Figure 19:
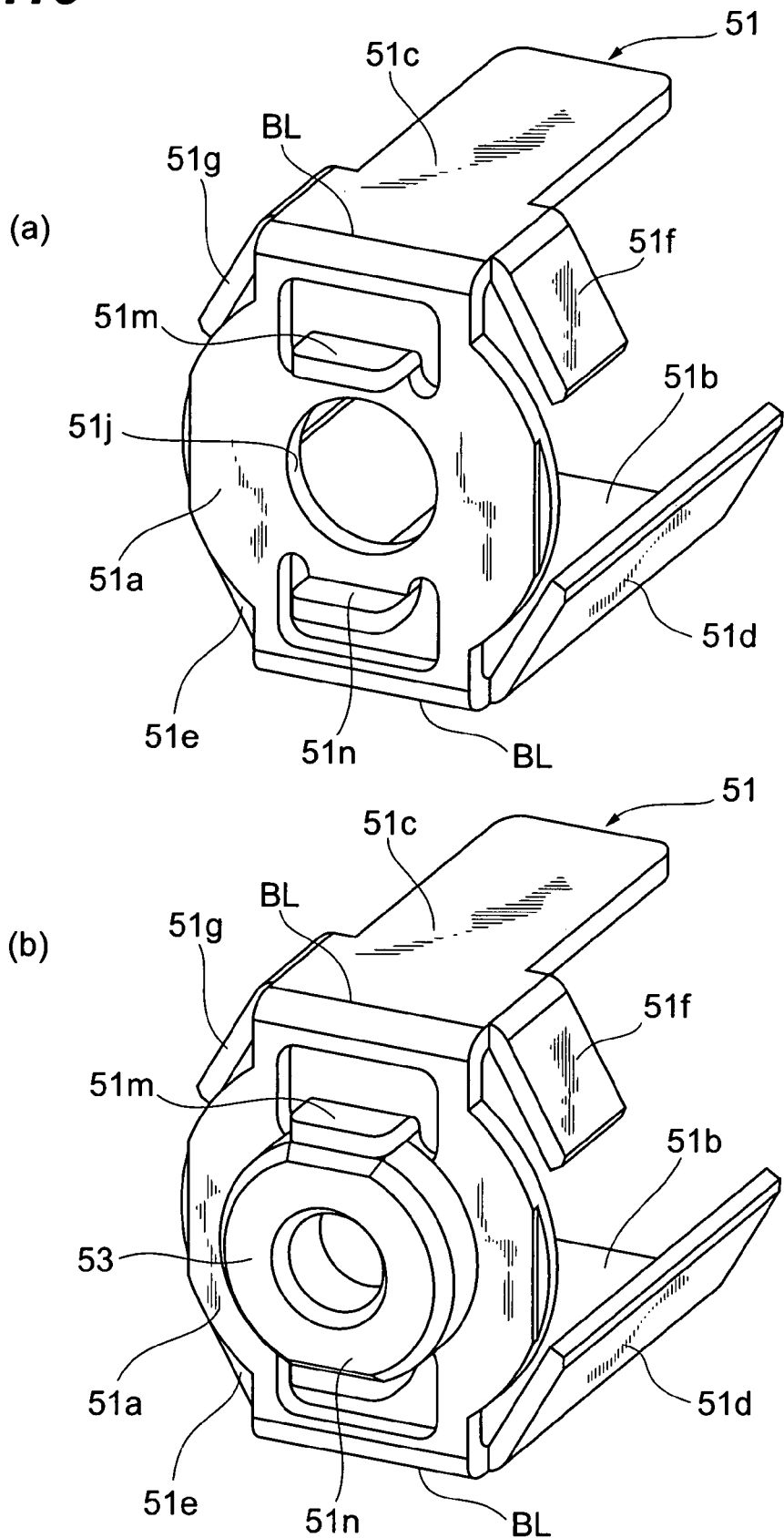
FIG. 19 is a perspective view showing a front case section and a bearing of a stepping motor as claimed in a third embodiment of the present invention, with (a) of FIG. 19 showing a front case section and (b) of FIG. 19 showing a front case section to which a bearing has been attached.
Figure 20:
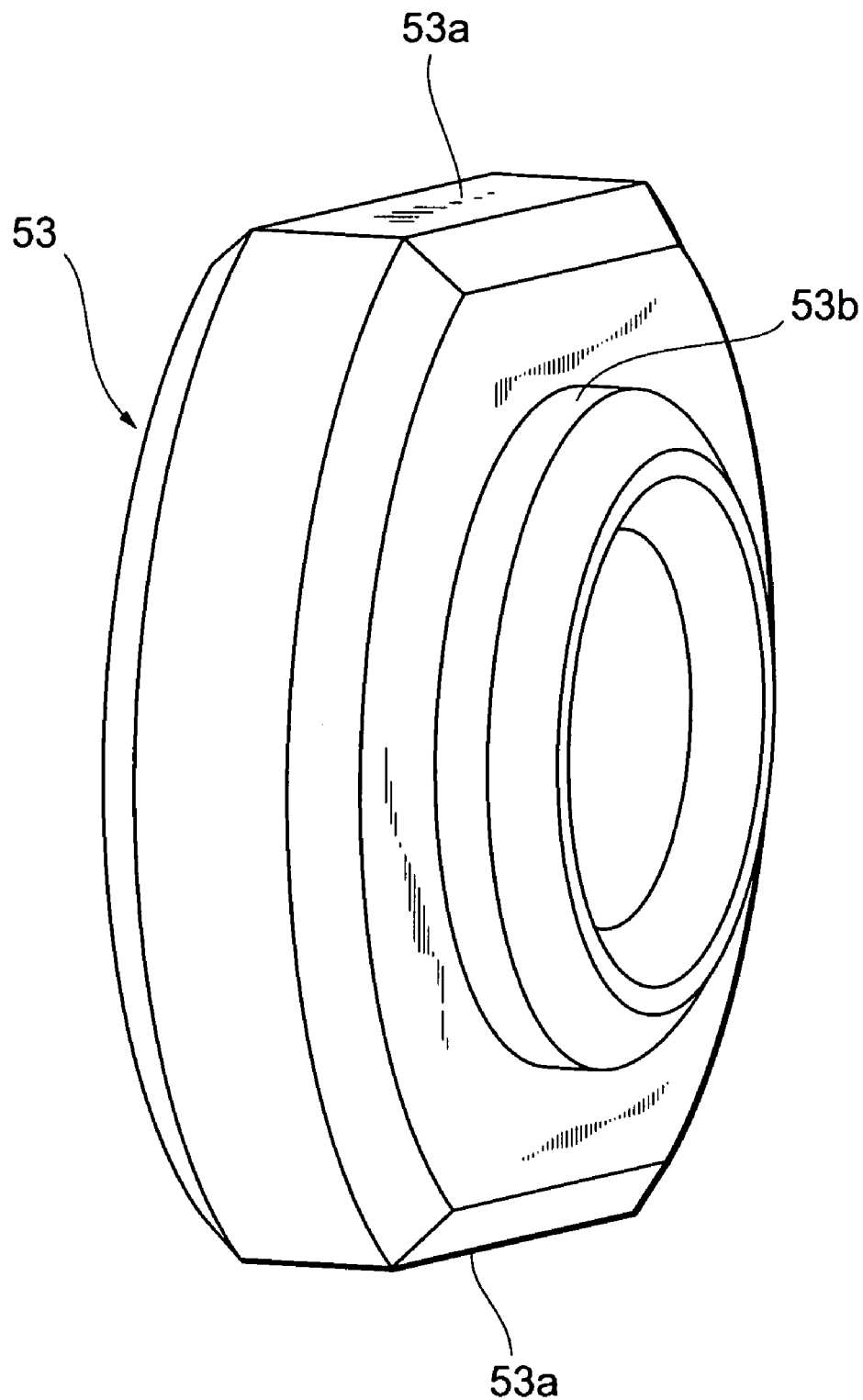
FIG. 20 is a perspective view of a bearing of a stepping motor as claimed in a third embodiment.

As shown in FIGS. 19 and 20, front case section 51 of the stepping motor as claimed in a third embodiment is formed by bending a single plate material made of stainless steel punched out to a predetermined shape. In a developed state, the front case section 51 is provided with an end plate 51a to which a front side bearing 53 is fixed for supporting rotating shaft 3, a flat base plate 51b extending from end plate 51a, and a flat top plate 51c extending from end plate 51a and in opposition to base plate 51b. The front case section 51 is formed by bending at a right angle at a linear bending line BL between end plate 51a and base plate 51b, and is formed by bending at a right angle at a linear bending line BL between end plate 51a and top plate 51c. Moreover, similar to the stepping motor 1 as claimed in the first embodiment, the front case section 51 is provided with first and second side plates (base plate side plates) 51d and 51e, and third and fourth side plates (top plate side plates) 51f and 51g.

A circular hole 51j for centering a bearing 53 is formed in the center of end plate 51a. Moreover, U-shaped grooves are formed in end plate 51a to as to be point symmetrical with respect to the center point of circular hole 51j on the sides of base plate 51b and top plate 51c with circular hole 51j positioned there between. A pair of bearing supports (bearing clamp) 51m and 51n are formed in which rectangular pieces surrounded the grooves are bent so as to rise perpendicularly to the outside and together with protruding from the outer surface of end plate 51a, extend in parallel and in mutual opposition. A pair of flat surfaces 53a that contact bearing supports 51m and 51n, and an annular engagement portion 53b inserted into circular hole 51j are formed on bearing 53. Bearing 53 is fixed by being pressed between bearing supports 51m and 51n protruding to the outside while inserting engagement portion 53b into circular hole 51j. In this manner, by externally attaching bearing 53 to front case section 51, stators 7A and 7B and rotor 5 within housing 25 can be increased in size in the direction of axial line L of rotating shaft 3, thereby making it possible to increase motor output.

Fourth Embodiment

Next, an explanation is provided of a stepping motor as claimed in a fourth embodiment. Furthermore, the explanation focuses only on those aspects of the stepping motor of the fourth embodiment that are different from the stepping motor 1 as claimed in the first embodiment, and the same reference symbols are used to indicate those constituents employing the same constitution as stepping motor 1, the explanation thereof being omitted.

Figure 21:
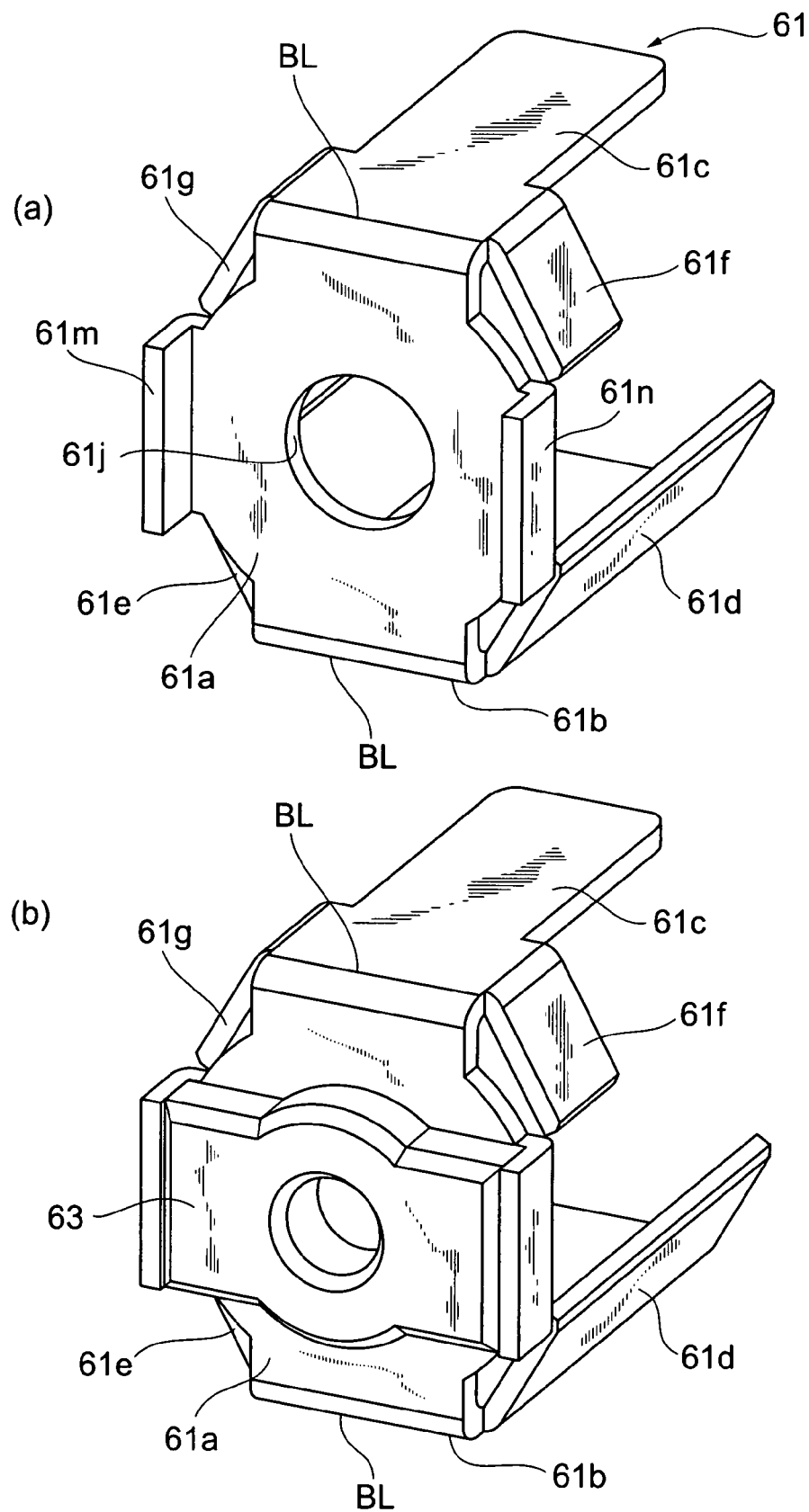
FIG. 21 is a perspective view showing a front case section and a bearing of a stepping motor as claimed in a fourth embodiment of the present invention, with (a) of FIG. 21 showing a front case section, and (b) of FIG. 21 showing a front case section to which a bearing has been attached.
Figure 22:
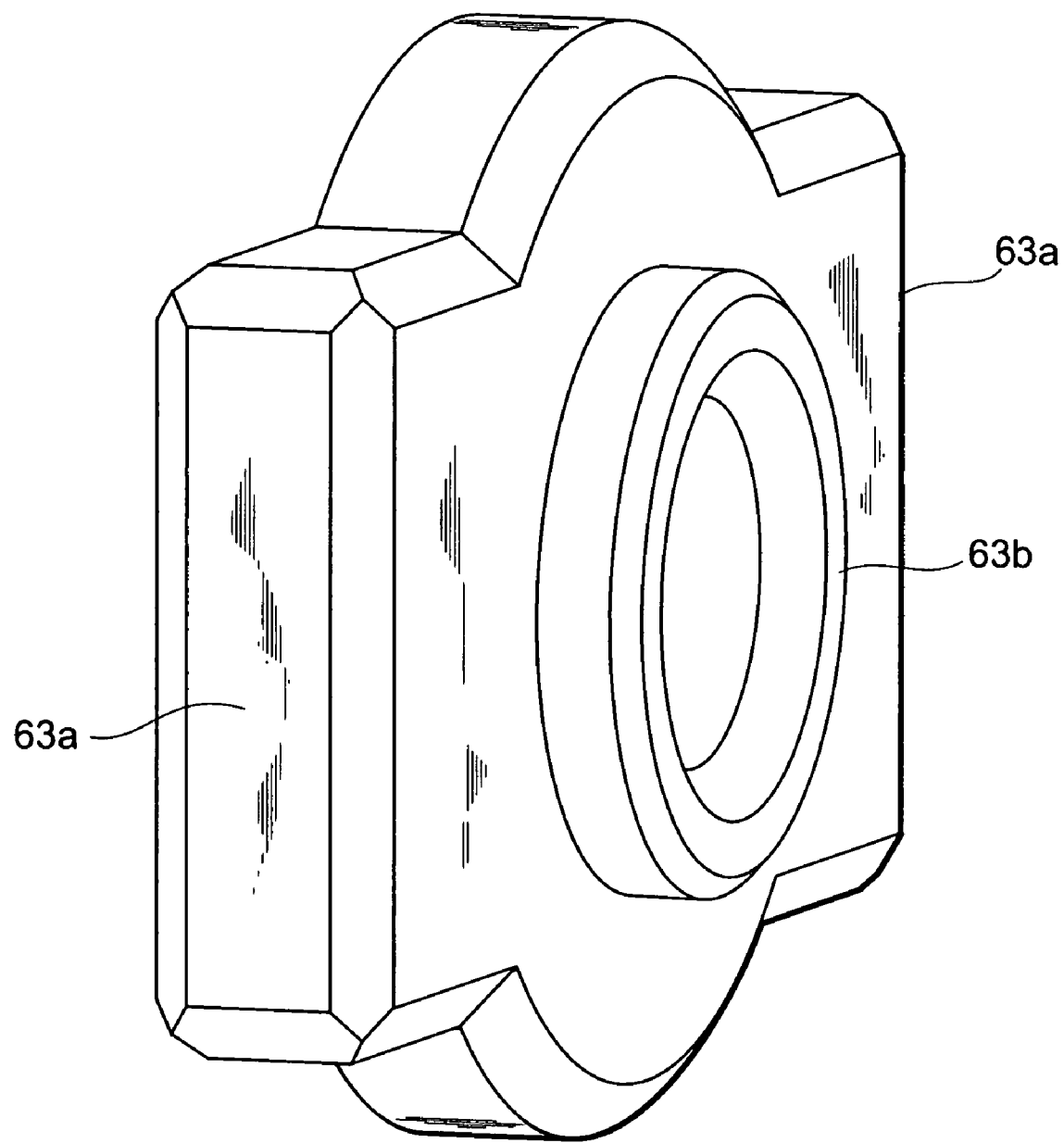
FIG. 22 is a perspective view of a bearing of a stepping motor as claimed in a fourth embodiment.

As shown in FIGS. 21 and 22, front case section 61 of the stepping motor as claimed in a fourth embodiment is formed by bending a single plate material made of stainless steel punched out to a predetermined shape. In a developed state, the front case section 61 is provided with an end plate 61a to which a front side bearing 63 is fixed for supporting rotating shaft 3, a flat base plate 61b extending from end plate 61a, and a flat top plate 61c extending from end plate 61a and in opposition to base plate 61b. The front case section 61 is formed by bending at a right angle at a linear bending line BL between end plate 61a and base plate 61b, and is formed by bending at a right angle at a linear bending line BL between end plate 61a and top plate 61c. Moreover, similar to the stepping motor 1 as claimed in the first embodiment, the front case section 61 is provided with first and second side plates (base plate side plates), 61d and 61e, and third and fourth side plates (top plate side plates) 61f and 61g.

A circular hole 61j for centering a bearing 63 is formed in the center of end plate 61a, and a pair of bearing supports (bearing clamp) 61m and 61n are formed on both sides so that circular hole 61j is positioned there between in which rectangular projections are formed by bending so as to rise perpendicularly from the outer surface of end plate 61a and extend in parallel in mutual opposition. A pair of flat surfaces 63a that contact bearing supports 61m and 61n, and an annular engagement portion 63b inserted into circular hole 61j are formed on bearing 63. Bearing 63 is fixed by being pressed between bearing supports 61m and 61n protruding to the outside while inserting engagement portion 63b into circular hole 61j. In this manner, by externally attaching bearing 63 to front case section 61, stators 7A and 7B and rotor 5 within housing 25 can be increased in size in the direction of axial line L of rotating shaft 3, thereby making it possible to increase motor output.

Fifth Embodiment

Next, an explanation is provided of a stepping motor as claimed in a fifth embodiment. Furthermore, the explanation focuses only on those aspects of the stepping motor of the fifth embodiment that are different from the stepping motor 1 as claimed in the first embodiment, and the same reference symbols are used to indicate those constituents employing the same constitution as stepping motor 1, the explanation thereof being omitted.

Figure 23:
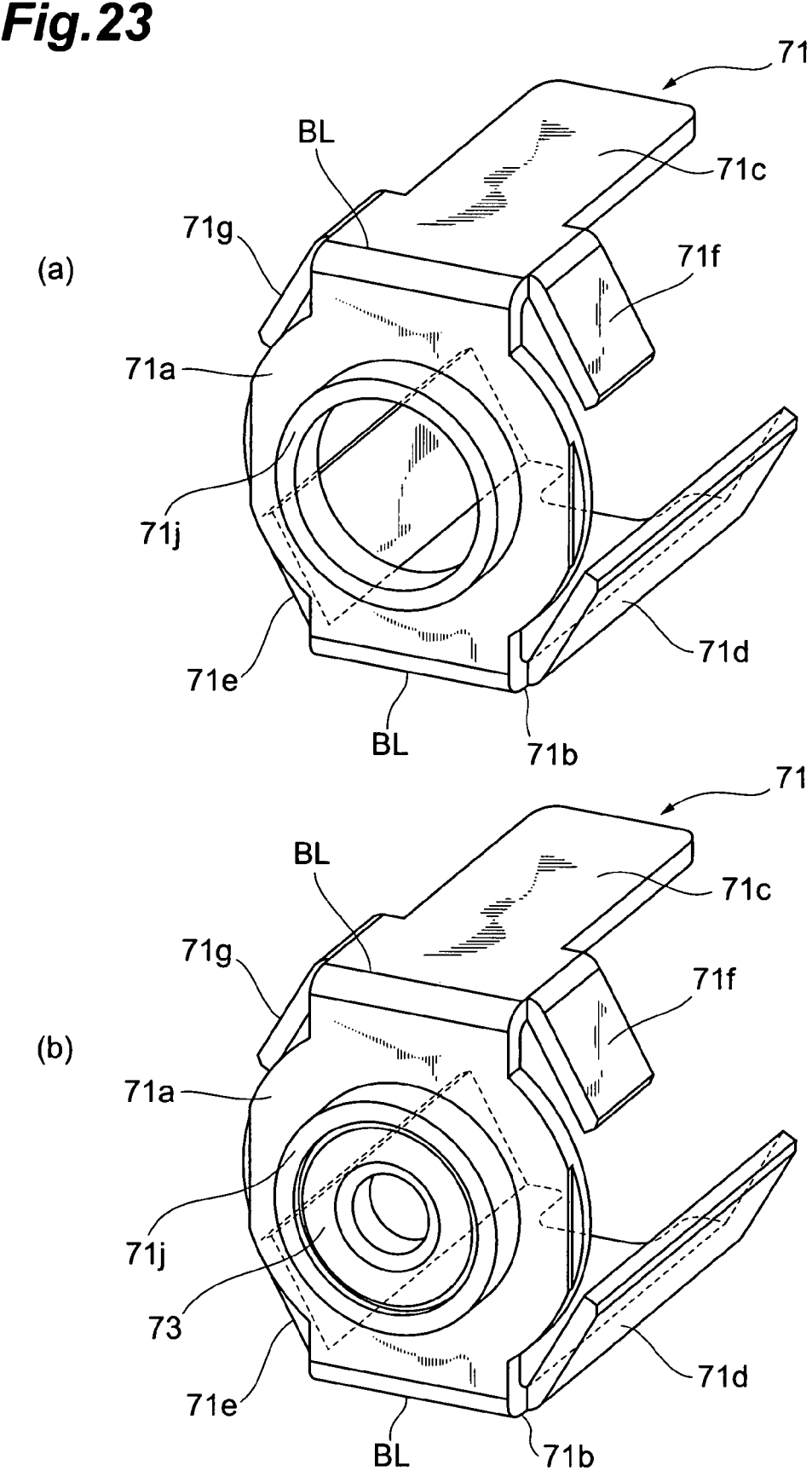
FIG. 23 is a perspective view showing a front case section and bearing of a stepping motor as claimed in the a fifth embodiment of the present invention, with (a) of FIG. 23 showing a front case section, and (b) of FIG. 23 showing a front case section to which a bearing has been attached.
Figure 24:
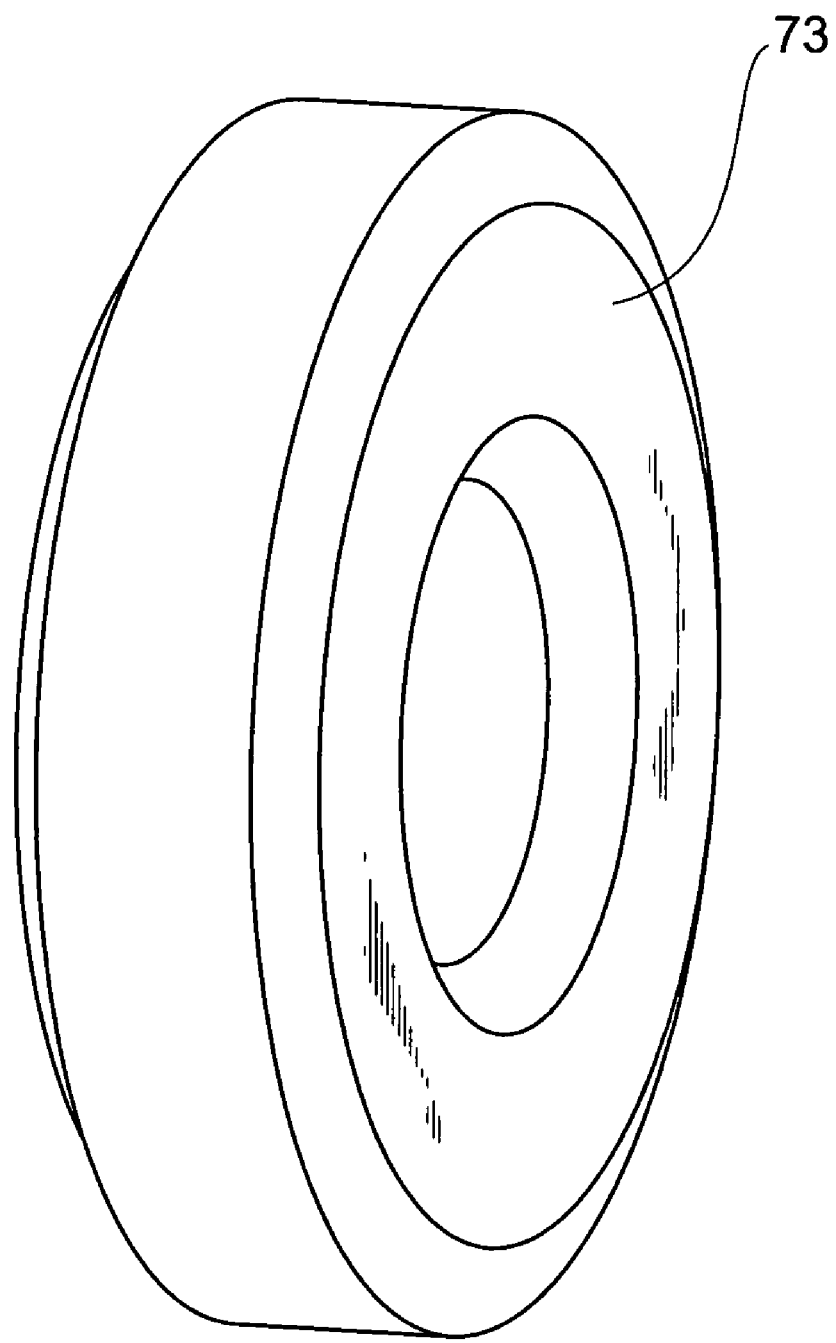
FIG. 24 is a perspective view of a bearing of a stepping motor as claimed in a fifth embodiment.

As shown in FIGS. 23 and 24, front case section 71 of the stepping motor as claimed in a fifth embodiment is formed by bending a single plate material made of stainless steel punched out to a predetermined shape. In a developed state, the front case section 71 is provided with an end plate 71a to which a front side bearing 73 is fixed for supporting rotating shaft 3, a flat base plate 71b extending from end plate 71a, and a flat top plate 71c extending from end plate 71a and in opposition to base plate 71b. The front case section 71 is formed by bending at a right angle at a linear bending line BL between end plate 71a and base plate 71b, and is formed by bending at a right angle at a linear bending line BL between end plate 71a and top plate 71c. Moreover, similar to the stepping motor 1 as claimed in the first embodiment, the front case section 71 is provided with first and second side plates (base plate side plates) 71d and 71e, and third and fourth side plates (top plate side plates) 71f and 71g.

For the end plate 71a, as shown in (a) of FIG. 23, a cylindrical section (bearing clamp) 71j rising perpendicularly from the outer surface of end plate 71a is formed in the center by drawing. Bearing 73 has an annular shape, and as shown in (b) of FIG. 23, is fixed by pressing into or adhering to cylindrical section 71j protruding to the outside. In this manner, by externally attaching bearing 73 to front case section 71, stators 7A and 7B and rotor 5 within housing 25 can be increased in size in the direction of axial line L of rotating shaft 3, thereby making it possible to increase motor output.

Sixth Embodiment

Next, an explanation is provided of a stepping motor as claimed in a sixth embodiment. Furthermore, the explanation focuses only on those aspects of the stepping motor of the sixth embodiment that are different from the stepping motor 1 as claimed in the first embodiment, and the same reference symbols are used to indicate those constituents employing the same constitution as stepping motor 1, the explanation thereof being omitted.

Figure 25:
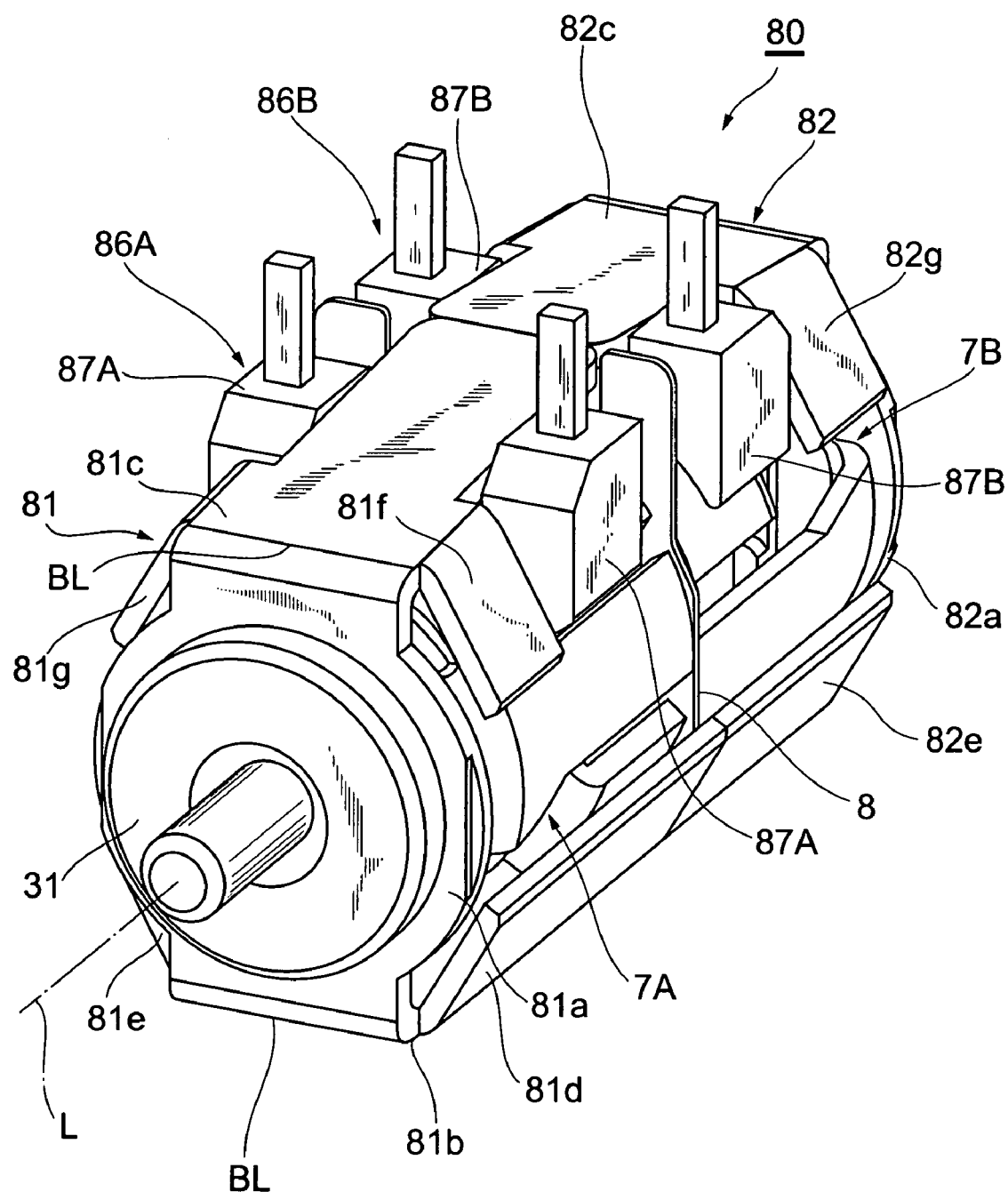
FIG. 25 is a perspective view of a stepping motor as claimed in a sixth embodiment.
Figure 26:
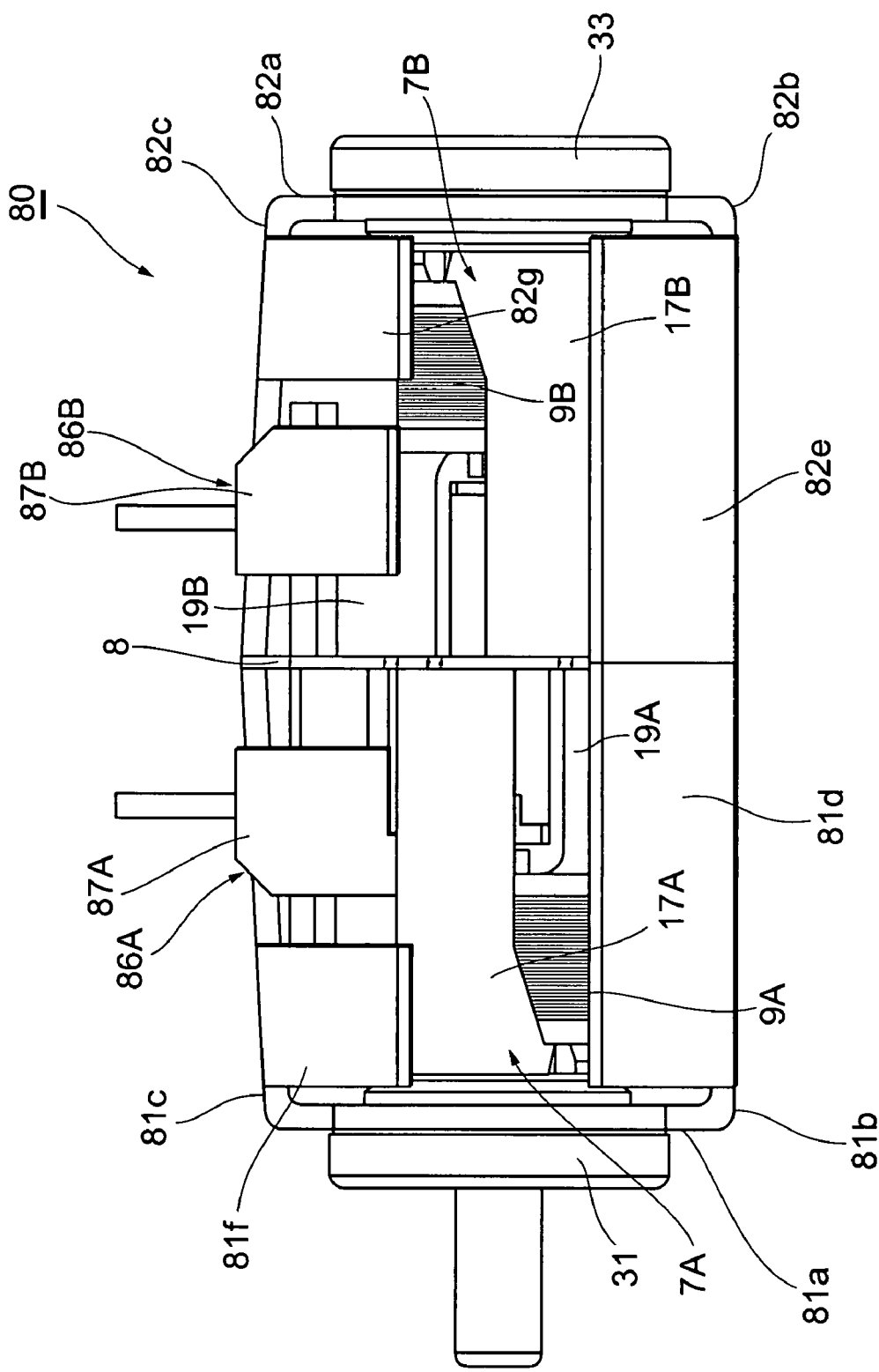
FIG. 26 is a side view of a stepping motor as claimed in a sixth embodiment.
Figure 27:
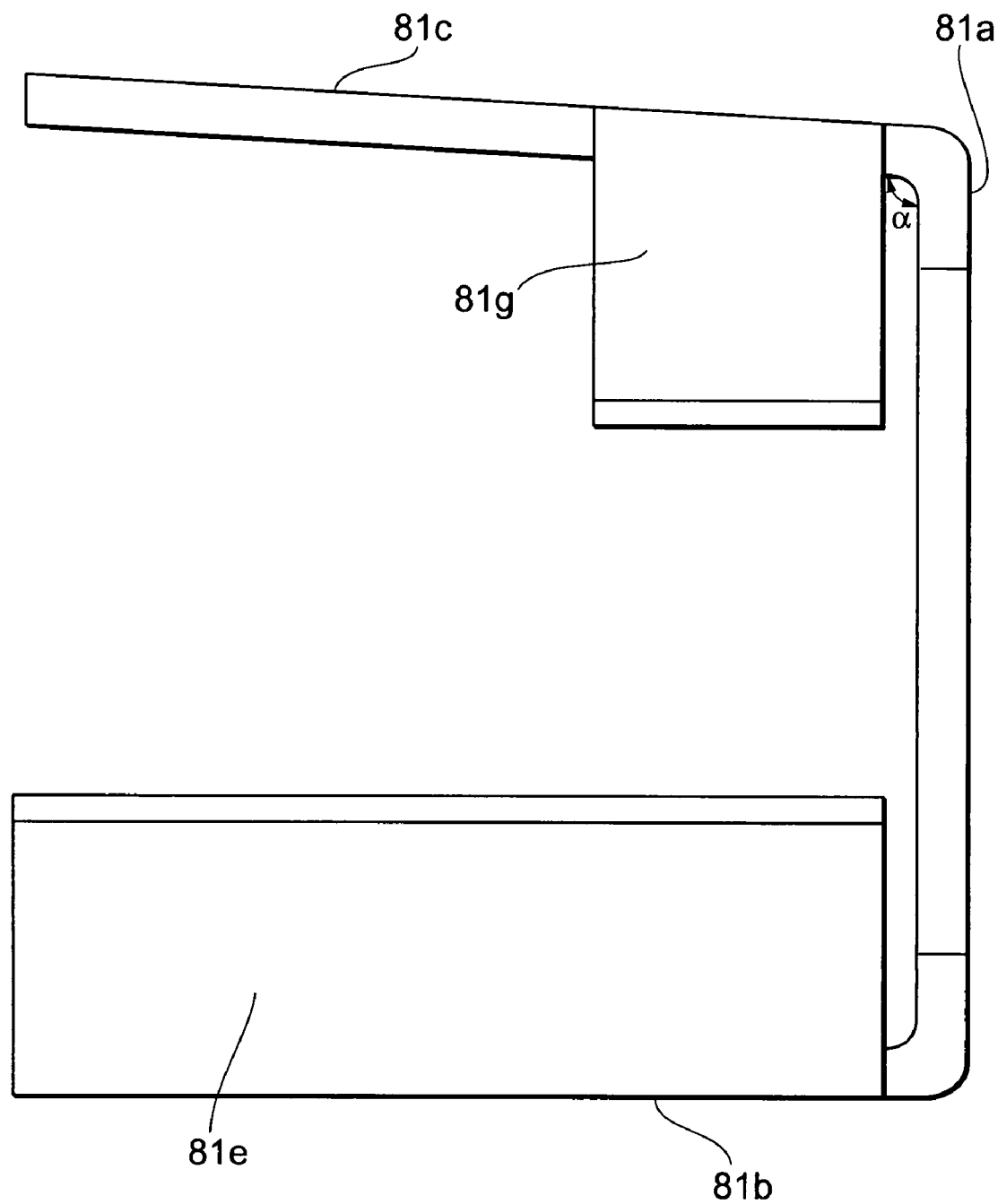
FIG. 27 is a side view of a front case section of a stepping motor as claimed in a sixth embodiment.

As shown in FIGS. 25 to 27, front case section 81 and rear case section 82 of the stepping motor 80 as claimed in this sixth embodiment are formed by bending a single plate material made of stainless steel punched out to a predetermined shape. In a developed state, front case section 81 is provided with an end plate 81a to which a front side bearing 31 is fixed for supporting rotating shaft 3, a flat base plate 81b extending from end plate 81a, and a flat top plate 81c extending from end plate 81a and in opposition to base plate 81b. The front case section 81 is formed by bending at a right angle at a linear bending line BL between end plate 81a and base plate 81b, and is formed by bending at a right angle at a linear bending line BL between end plate 81a and top plate 81c. On the other hand, front case section 81 is also formed by bending at a linear bending line BL between end plate 81a and top plate 81c so that bending angle α (see FIG. 27) becomes an obtuse angle, and this point differs from stepping motor 1 as claimed in the first embodiment in which the front case section is bent at a right angle. Furthermore, similar to the stepping motor 1 as claimed in the first embodiment, the front case section 81 is provided with first and second side plates (base plate side plates) 81d and 81e, and third and fourth side plates (top plate side plates) 81f and 81g.

In a developed state, the rear case section 82 is provided with an end plate 82a, base plate 82b, top plate 82c, first and second side plates (base plate side plates) 82d and 82e, and third and fourth side plates (top plate side plates) 82f and 82g in the same manner as the front case section 81, and is formed by bending in the same manner as front case section 81.

Figure 28:
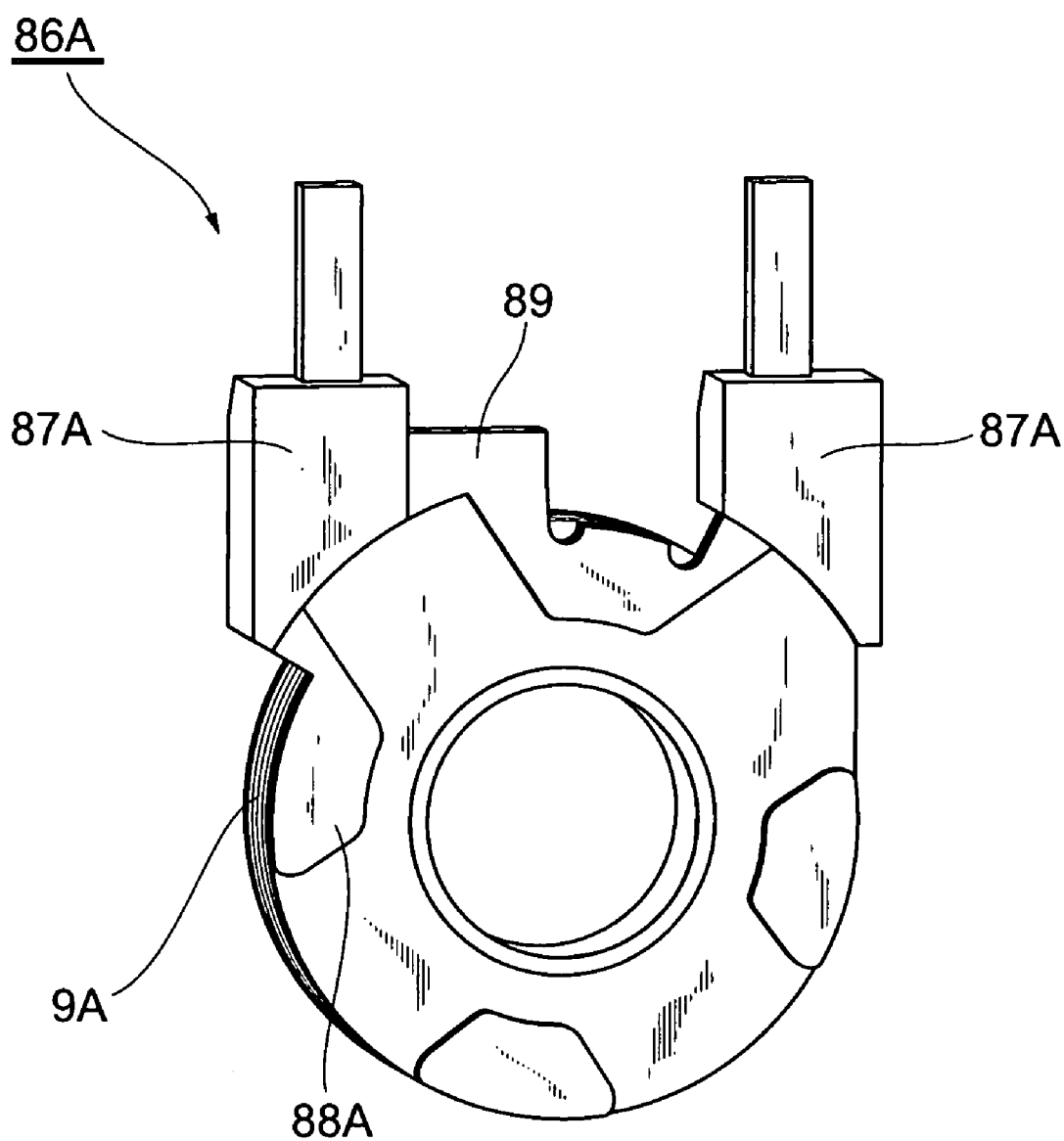
FIG. 28 is a perspective view of a bobbin and terminal board holding a coil as claimed in a sixth embodiment.
Figure 29:
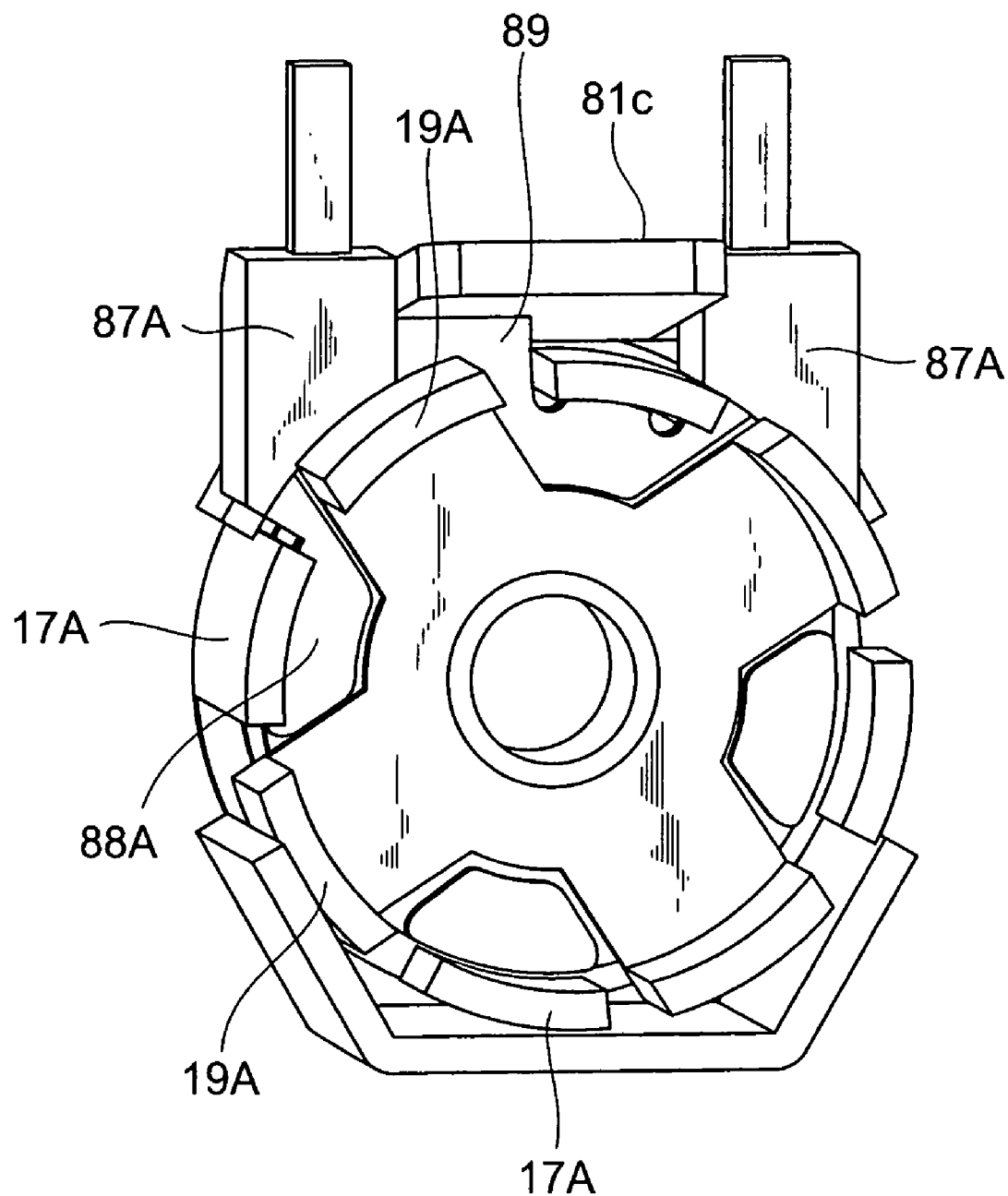
FIG. 29 is a perspective view showing a front case section installed with a stator and terminal unit of a stepping motor as claimed in a sixth embodiment; and, FIG. 30 is an exploded perspective view of the stepping motor shown in FIG. 1.
Figure 30:
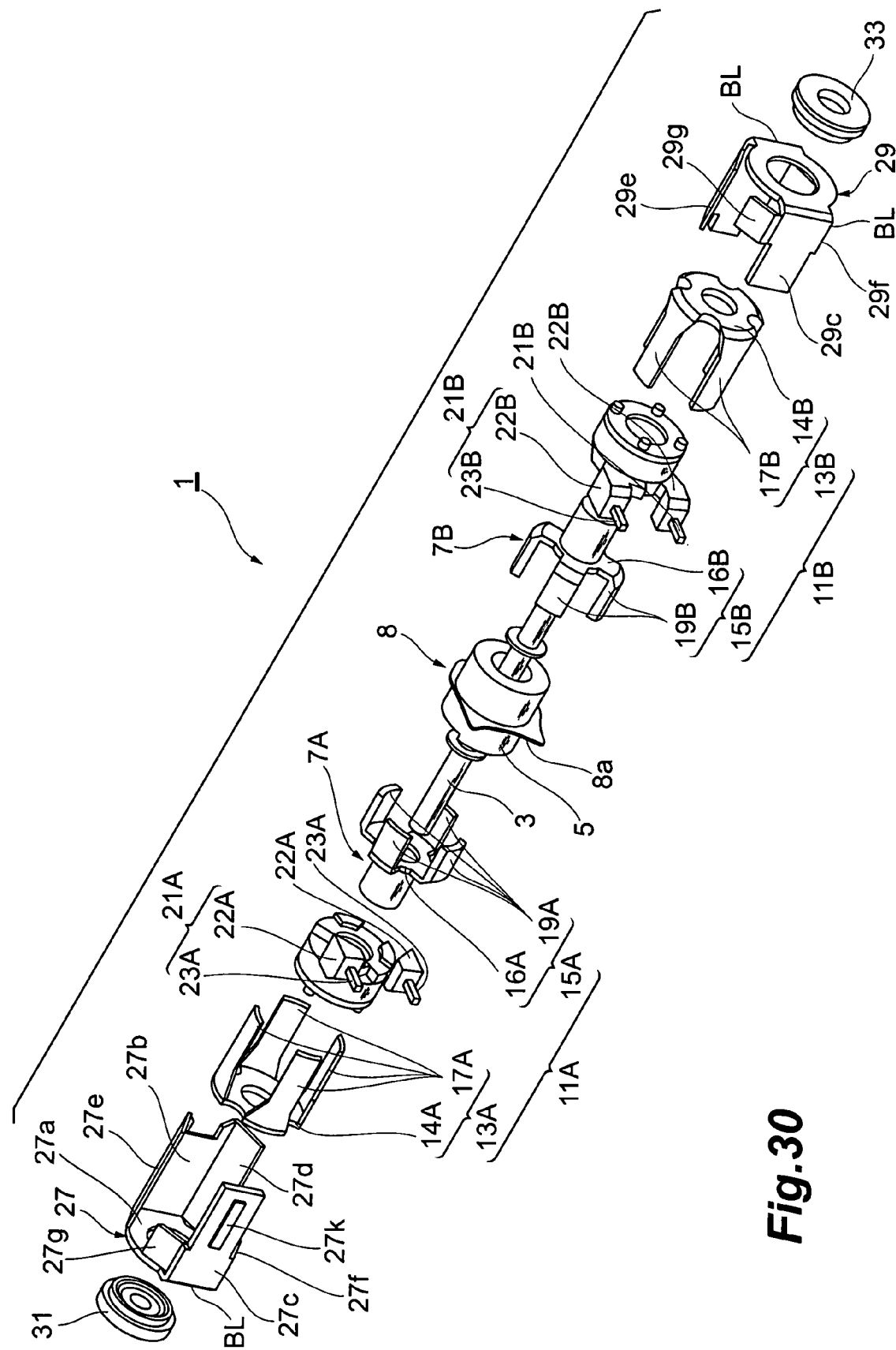

As shown in FIGS. 28 and 29, a terminal unit 86A is provided with terminal boards 87A separated to the left and right, and a bobbin 88A integrally formed with terminal boards 87A. Moreover, a projection 89 is provided on the upper end of bobbin 88A. The terminal boards 87A separated to the left and right are divided by top plate 81c, and projection 89 contacts the back of diagonally inclined top plate 81c. The terminal boards 87A and bobbin 88A are accurately positioned by top plate 81c. Similarly, terminal boards 87B separated to the left and right sides of terminal unit 86B are divided by top plate 82c of rear case section 82, and a projection not shown contacts the back of diagonally inclined top plate 82c. The terminal boards 87B and bobbin 88B are accurately positioned by top plate 82c.

As has been described above, although the locations where contact is made between the base plates and top plates in each of the embodiments is shifted toward the rear from the boundary positions of the magnetic pole teeth, the locations where contact is made between only one of these may be shifted, contact may be made at locations extending towards the front beyond the boundary positions of the base plates and top plates of the rear case sections, or the contact locations between the base plates and top plates may be shifted towards the front from the boundary positions. Furthermore, a reinforcing rib can be provided to the base plate. In addition, although side plates are provided in each of the embodiments for supporting the stators from the sides, these side plates may also be omitted, and the stators may be supported from the sides by other means.

What is claimed is:

1. A stepping motor comprising: a rotor fixed to a rotating shaft and comprising alternately magnetized N and S poles; a pair of front and rear stators having magnetic pole teeth surrounding the rotor; and a housing surrounding the stators, wherein the housing consists of a pair of case sections arranged in front and rear in an axial direction of the rotating shaft, the case sections in a developed state comprise: an end plate to which a bearing for supporting the rotating shaft is fixed, a base plate extending from the end plate, a top plate extending from the end plate in opposition to the base plate, and side plates protruding from the base plates, and side plates protruding from the top plates, wherein the side plates on the base plate side are formed by bending towards the inside of the housing at an obtuse angle between the base plates and the side plates, and the side plates on the top plate side are formed by bending towards the inside of the housing at an obtuse angle between the top plates and the side plates, and, the base plate and the top plate are formed by bending so that the base plates and top plates surround the stators and are mutually opposed.

2. The stepping motor according to claim 1, wherein a plurality of terminal boards protruding from the housing are separated by the top plates.

3. The stepping motor according to claim 1, wherein a projection provided on the end of one of the base plates arranged in the axial direction and an indentation provided in the end of the other base plate are engaged.

4. The stepping motor according to claim 3, wherein clamps spread to the outside extending in the axial direction are provided on the end of the projection and the end of the top plate.

5. The stepping motor according to claim 1, wherein at least one of contacting positions of the ends of the base plates and contacting positions of the ends of the top plates is shifted farther in the axial direction than the boundary position of the magnetic pole teeth in the axial direction.

6. The stepping motor according to claim 1, wherein a reinforcing rib extending in the axial direction is provided on at least one of the base plate and top plate.

7. The stepping motor according to claim 1, wherein a bearing clamp protruding to the outside is provided on an outer surface of the end plate, and the bearing is held on the end plate by the bearing clamp.

8. The stepping motor according to claim 1, further comprising an annular magnetic insulating spacer arranged between the pair of stators arranged in the axial direction, wherein a notch into which the top plates are inserted is provided in the periphery of the spacer.

* * * * *